(12) United States Patent
Kapp

(10) Patent No.: US 7,761,333 B2
(45) Date of Patent: Jul. 20, 2010

(54) INCOME TAX PREPARATION SYSTEM FOR TRAVELING TAXPAYERS

(76) Inventor: Martin A. Kapp, 9841 Airport Blvd., Suite 1500, Los Angeles, CA (US) 90045

( * ) Notice: Subject to any disclaimer, the term of this patent is extended or adjusted under 35 U.S.C. 154(b) by 1437 days.

(21) Appl. No.: 10/964,335

(22) Filed: Oct. 13, 2004

(65) Prior Publication Data

US 2005/0086137 A1  Apr. 21, 2005

Related U.S. Application Data

(63) Continuation-in-part of application No. 09/934,629, filed on Aug. 21, 2001, now Pat. No. 6,978,254.

(51) Int. Cl.
*G06G 1/14* (2006.01)
*G06Q 20/00* (2006.01)
*G06F 17/22* (2006.01)
*G06F 19/00* (2006.01)

(52) U.S. Cl. .......................................... 705/22; 705/31

(58) Field of Classification Search ....................... None
See application file for complete search history.

(56) References Cited

U.S. PATENT DOCUMENTS

| | | | |
|---|---|---|---|
| 4,852,001 A | 7/1989 | Tsushima et al. |
| 5,193,055 A | 3/1993 | Brown et al. |
| 5,237,499 A | 8/1993 | Garback |
| 5,335,169 A | 8/1994 | Chong |
| 5,535,322 A | 7/1996 | Hecht |
| 5,570,283 A | 10/1996 | Shoolery et al. |
| 5,630,073 A | 5/1997 | Nolan |
| 5,819,249 A | 10/1998 | Dohanich et al. |
| 5,875,435 A | 2/1999 | Brown |
| 5,893,074 A | 4/1999 | Hughes et al. |
| 5,948,040 A | 9/1999 | DeLorme et al. |
| 5,953,706 A | 9/1999 | Patel |
| 5,970,481 A * | 10/1999 | Westerlage et al. ......... 705/417 |
| 5,987,429 A | 11/1999 | Maritzen et al. |

(Continued)

OTHER PUBLICATIONS

Hoven. 1998 Per Diem Amounts. http://web.archive.org/web/20000207214104/http://www.hoven.com/prperdie.html.*

(Continued)

*Primary Examiner*—Matthew S Gart
*Assistant Examiner*—R. Shay Glass
(74) *Attorney, Agent, or Firm*—David A. Belasco; Belasco Jacobs & Townsley, LLP

(57) ABSTRACT

A system for determining travel deductions includes a city rate table identifying allowed per diem expense rates for each city. Cities visited, durations of stay and expense reimbursements received from the taxpayer's employer are input to the system. The system calculates a total of all per diem expenses and for offsets reimbursements received against the total to determine an incidental expense allowance. For use with merchant sailors, a ship location table with city rate codes for each day of a tax year for a plurality of ships is compared with the sailor's input ship names and starting and ending dates for work on each of the ships. A system for truckers and bus drivers includes a GPS tracking system that continuously provides vehicle locations to the system for calculation of per diem expense allowances when coupled with a daily vehicle use table and receiver code and vehicle number correlation table.

42 Claims, 36 Drawing Sheets

U.S. PATENT DOCUMENTS

| | | | | |
|---|---|---|---|---|
| 6,009,408 | A | * | 12/1999 | Buchanan .................... 705/11 |
| H1830 | H | | 1/2000 | Petrimoulx et al. |
| 6,741,933 | B1 | * | 5/2004 | Glass ........................ 701/213 |
| 2005/0203816 | A1 | * | 9/2005 | Monsor et al. ................ 705/31 |

OTHER PUBLICATIONS 1998 per diem amounts by Vernon Hoven.*
Merrian-Webster's Dictionary of law, 1996 Merriam-Webster, Inc.*
41 C.F.R. section 300-3.1.*

* cited by examiner

| City Rate Code | City Code | Year | High Cost | Meal Rate | Full Rate | Oconus Sheet ID | High City ID |
|---|---|---|---|---|---|---|---|
| 1928 | 5 | 1993 | No | $102.00 | | 93 antwerp 102.doc | |
| 660 | 5 | 1994 | No | $100.00 | | 94 antwerp 100.doc | |
| 661 | 5 | 1995 | No | $114.00 | | 95 antwerp 114.doc | |
| 662 | 5 | 1996 | No | $86.00 | | 96 antwerp 86.doc | |
| 2553 | 5 | 1997 | No | $78.00 | | 97 antwerp 78.doc | |
| 4882 | 5 | 1998 | No | $72.00 | | 98 antwerp belgium 72.doc | |
| 5930 | 5 | 1999 | No | $74.00 | $181.00 | 99 antwerp belgium 74 181.doc | |
| 7269 | 5 | 2000 | No | $62.00 | $151.00 | 00 Antwerp Belgium 62 151.doc | |
| 2026 | 6 | 1993 | No | $38.00 | | 94 san francisco ca 38.doc | |
| 1328 | 6 | 1994 | No | $38.00 | | 95 san francisco ca 38.doc | |
| 891 | 6 | 1995 | No | $38.00 | | 96 san francisco ca 38.doc | |
| 1662 | 6 | 1996 | No | $38.00 | | 94 new york ny 38.doc | |
| 1100 | 8 | 1994 | No | $38.00 | | 95 new york ny 38.doc | |
| 1489 | 8 | 1995 | No | $38.00 | | 96 new york ny 38.doc | |
| 1755 | 8 | 1996 | No | $38.00 | | 94 oakland ca 38.doc | |
| 1160 | 9 | 1993 | No | $38.00 | | 95 oakland ca 38.doc | |
| 652 | 9 | 1994 | No | $38.00 | | 96 oakland ca 34.doc | |
| 1507 | 9 | 1995 | No | $38.00 | | 97 oakland ca 34.doc | |
| 1653 | 9 | 1996 | No | $34.00 | | | |
| 2907 | 9 | 1997 | Yes | $34.00 | | | 97h san francisc |

| | Tax Year | City / State / Country | # Days |
|---|---|---|---|
| | 1999 | Minneapolis/MN/ | 3 |
| | 1999 | Dallas/TX/ | 3 |
| | 1999 | Philadelphia/PA/ | 3 |
| | 1999 | Los Angeles/CA/ | 3 |
| | 1999 | San Salvador//El Salvador | 1 |

City Schedule

Client#: P1013
Name: Michael Patrick
Soc. Sec. #: 589-38-6042
Tax Year: 1999
Client Info
Project Info City: Minneapolis
Days: 3
State: MN
Country:

Airport Identifier:
Airport Name:
Linked To:
Full Rate:

Click the explode button to edit.
Total Days For Year: 242

Delete Record    Add Record

Goto Travel Schedule
Record: 1 of 42 (Filtered)
Goto City Rates    Done

Fig. 5

| USA States : Table | | | | |
|---|---|---|---|---|
| | State | State/Name | Lower 48 State ? | IRS Center |
| | AK | Alaska | No | 3 |
| | AL | Alabama | Yes | 2 |
| | AR | Arkansas | Yes | 2 |
| | AZ | Arizona | Yes | 3 |
| | CA | California | Yes | 3 |
| | CO | Colorado | Yes | 5 |
| | CT | Connecticut | Yes | 1 |
| | DC | Dist. of Columbia | Yes | 1 |
| | DE | Delaware | Yes | 6 |
| | FL | Florida | Yes | 6 |
| | GA | Georgia | Yes | 4 |
| | HI | Hawaii | No | 7 |
| | IA | Iowa | Yes | 3 |
| | ID | Idaho | Yes | 7 |
| | IL | Illinois | Yes | 8 |
| | IN | Indiana | Yes | 9 |
| | KS | Kansas | Yes | 8 |
| | KY | Kentucky | Yes | 2 |
| | LA | Louisiana | Yes | 5 |
| | MA | Massachusetts | Yes | |

Fig. 6

| City Code | City | State | Country |
|---|---|---|---|
| 6 | Antwerp | | Belgium |
| 6 | San Francisco | Ca | |
| 8 | New York | NY | |
| 9 | Oakland | Ca | |
| 10 | Monterey | Ca | |
| 11 | Paris | | France |
| 12 | Berlin | | Germany |
| 13 | Bridgeport <Sacramento> | Ca | |
| 14 | Chico <Sacramento> | Ca | |
| 17 | Clearlake | CA | |
| 18 | Birmingham | AL | |
| 19 | Gulf Shores | AL | |
| 20 | Anchorage | AK | |
| 22 | Hartford | CT | |
| 25 | Charleston | SC | |
| 27 | Rotterdam | | Netherlands |
| 28 | Port Said | | Egypt |
| 29 | Mogadishu | | Somalia |
| 30 | Aspen | SC | |
| 31 | Cairo | | Egypt |
| 32 | Sheffield <Huntsville> | AL | |
| 33 | Grand Canyon | AZ | |
| 34 | Phoenix | AZ | |
| 35 | Scottsdale | AZ | |
| 36 | Prescott | AZ | |
| 37 | Tucson | AZ | |
| 38 | Hot Springs | AR | |
| 39 | Little Rock | AR | |
| 40 | Texarkana | AR | |
| 41 | El Centro <Palm Springs> | CA | |

Fig. 6A

| Airports : Table | | | | | | |
|---|---|---|---|---|---|---|
| Control# | Airport Identifier | Location | AirportName | CityCode | Latitude | Longitude |
| 3 | SIN | Aalborg, Denmark | Aalborg | 162 | N57°05.5' | E009°51.0' |
| 4 | AAR | Aarhus, Denmark | Tirstrup | | N56°18.6' | E010°37.0' |
| 5 | OIAA | Abadan, Iran | Abadan Intl | | N30°21.9' | E048°13.9' |
| 6 | ABE | Allentown, Pa | Allentown | 197 | N40°39.2' | W075°26.3' |
| 7 | ABI | Abilene, Texas | Abilene Municipal | | N32°24.6' | W099°40.9' |
| 8 | DIII | Abidjan, Ivory Coast | Port Bouet | | N05°15.3' | W003°55.6' |
| 9 | ABQ | Albuquerque, Nm | Albuquerque Intl | 165 | N35°02.5' | W106°36.3' |
| 10 | ABR | Aberdeen, Sd | Aberdeen Municipal | | N45°27.1' | W098°25.5' |
| 11 | ABS | Abu Simbel, Egypt | Abu Simbel | | N22°22.3' | E031°36.9' |
| 12 | ABV | Abuja, Nigeria | Abuja International | | N09°00.3' | E007°15.9' |
| 13 | ABY | Albany, Ga | Dougherty County | | N31°31.9' | W084°11.7' |
| 14 | MMAA | Acapulco, Mexico | Juan Alvarez Intl | 375 | N16°45.3' | W099°46.0' |
| 15 | DGAA | Accra, Ghana | Kotoka | | N05°35.7' | W000°10.2' |
| 16 | ACE | Lanzarote, Spain | Lanzarote | | N28°56.5' | W013°36.2' |
| 17 | ACT | Waco, Texas | Waco Municipal | | N31°36.6' | W097°13.7' |
| 18 | ACV | Arcata/eureka, Ca | Arcata | | N40°58.7' | W124°06.4' |
| 19 | ACY | Atlantic City, Nj | Atlantic City Intl | 161 | N39°27.4' | W074°34.6' |
| 20 | LTAF | Adana, Turkey | Incirlik | | N36°59.0' | E035°16.8' |
| 21 | HAAB | Addis Ababa, ethiopia | Bole | | N08°58.6' | E038°47.8' |
| 22 | ADJ | Amman, Jordan | Amman Civil | | N31°58.3' | E035°59.4' |
| 23 | ADK | Adak Island, Alaska | Adak Island Ns | | N51°52.9' | W176°38.6' |
| 24 | AAAD | Adelaide, Australia | Adelaide | 246 | S34°56.9' | E138°32.0' |

Record: 1 of 1975

Fig. 7

| Airlines : Table | |
|---|---|
| AirLineID | AirLineName |
| 7 | Amer Int'l Air |
| 23 | America West |
| 1 | American Air |
| 18 | American Eagle |
| 13 | Atlas Air |
| 20 | Business Jet Solutions |
| 8 | Continental |
| 9 | Delta Airlines |
| 5 | Emery Air |
| 19 | Eva Air |
| 21 | Executive Jet |
| 15 | Express One |
| 17 | Federal Express |
| 22 | Great Amer Air |
| 2 | Kitty Hawk |
| 14 | Midwest Express |
| 16 | Northwest |
| 12 | Polar Air Cargo |
| 11 | Ryan Int'l |
| 10 | Skywest |
| 4 | Southwest |
| 6 | U.P.S |

Record: |◁| ◁ | 1 | ▷ | ▷| | ▷* | of 23

Fig. 8

| IRS_Service_Centers : Table | | | | | | |
|---|---|---|---|---|---|---|
| IRSID | Name | City | State | Zip | EstAddress | EstCityStateZip |
| 1 | Internal Revenue Service | Philidelphia | PA | 19255 | P.O. Box 8318 | Philadelphia, PA 19162-8318 |
| 2 | Internal Revenue Service | Memphis | TN | 37501 | P.O. Box 1219 | Charlotte, NC 28201-1219 |
| 3 | Internal Revenue Service | Ogden | UT | 84201 | P.O. Box 510000 | San Francisco, CA 94151-5100 |
| 4 | Internal Revenue Service | Fresno | CA | 93888 | P.O. Box 54030 | Los Angeles, CA 90054-0030 |
| 5 | Internal Revenue Service | Andover | MA | 05501 | P.O. Box 371999 | Pittsburgh, PA 15250-7999 |
| 6 | Internal Revenue Service | Atlanta | GA | 39901 | P.O. Box 105900 | Atlanta, GA 30348-5900 |
| 7 | Internal Revenue Service | Kansas City | MO | 64999 | P.O. Box 970006 | St. Louis, MO 63197-0006 |
| 8 | Internal Revenue Service | Cincinnati | OH | 45999 | P.O. Box 7422 | 60680-7422 |
| 9 | Internal Revenue Service | Austin | TX | 73301 | P.O. Box 970001 | St. Louis, MO 63197-0006 |
| 10 | Internal Revenue Service | Holtsville | NY | 00501 | P.O. Box 162 | Newark, NJ 07101-0162 |

Fig. 9

| StateServiceCenters : Table | | | | |
|---|---|---|---|---|
| StateID | Name | Name2 | OweAddress | OweCity |
| AK | No State Return | | | |
| AL | Alabama Income Tax | | P.O. Box 2401 | Montgomery |
| AR | DFA | State Income Tax | P.O. Box 2144 | Little Rock |
| AZ | Arizona Dept of Revenue | | P.O. Box 52016 | Phoenix |
| CA | Franchise Tax Board | | P.O. Box 942867 | Sacramento |
| CO | Colorado Dept of Revenue | | 1375 Sherman Street | Denver |
| CT | DRS | | P.O. Box 2977 | Hartford |
| DC | Dept of Finance & Revenue | Ben Franklin Station | P.O. Box 7861 | Washington |
| DE | Delaware Division of Revenue | | P.O. Box 508 | Wilmington |
| FL | Florida Dept of Revenue | | 5050 W. Tennessee Street | Tallahassee |
| GA | Georgia Income Tax Division | | P.O. Box 740399 | Atlanta |
| HI | Hawaii Dept of Taxation | | P.O. Box 3559 | Honolulu |
| IA | Income Tax Processing | Iowa Depart of Revenue & Finance | Hoover State Office Building | Des Moines |
| ID | Idaho State Tax Commission | | P.O. Box 56 | Boise |
| IL | Illinois Dept of Taxation | | Springfield | Illinois |
| IN | Indiana Dept of Revenue | | P.O. Box 40 | Indianapolis |
| KS | Kansas Income Tax | Kansas Department of Revenue | 915 SW Harrison Street | Topeka |
| KY | Kentucky Revenue Cabinet | | | Frankfort |
| LA | LA Department of Taxation | Department of Revenue | P.O. Box 3440 | Baton Rouge |
| MA | MA Department of Revenue | | P.O. Box 7003 | Boston |

Fig. 10

| ZIPCODE: Table | | | |
|---|---|---|---|
| ZIP | STATE | CITY | COUNTY |
| 00501 | NY | Holtsville | Suffolk |
| 00544 | NY | Holtsville | Suffolk |
| 00601 | PR | Adjuntas | Adjuntas |
| 00602 | PR | Aguada | Aguada |
| 00603 | PR | Aguadilla | Aguadilla |
| 00604 | PR | Aguadilla | Aguadilla |
| 00605 | PR | Aguadilla | Aguadilla |
| 00606 | PR | Maricao | Maricao |
| 00610 | PR | Anasco | Anasco |
| 00611 | PR | Angeles | Utuado |
| 00612 | PR | Arecibo | Arecibo |
| 00613 | PR | Arecibo | Arecibo |
| 00614 | PR | Arecibo | Arecibo |
| 00616 | PR | Bajadero | Arecibo |
| 00617 | PR | Barceloneta | Barceloneta |
| 00622 | PR | Boqueron | Cabo Rojo |
| 00623 | PR | Cabo Rojo | Cabo Rojo |
| 00624 | PR | Penuelas | Penuelas |
| 00627 | PR | Camuy | Camuy |
| 00631 | PR | Adjuntas | Lares |

Record: |◁| ◁ | 128817 | ▷ |▷|| ▷* | of 43084

Fig. 11

☐ Attachments

Edit Document Attachments

Client ID Prefix: S — 210, 86, 106

Tax Year: 1995

Sort ID:

Description: NA

Document File Name

[Update Document List]

[Done]

Record: |◄ ◄ 1 ► ►| ►* of 4 (Filtered) — 132

Fig. 12

| MealRatePercent : Table | |
|---|---|
| TaxYear | MealRatePercent |
| 1993 | 50 |
| 1994 | 50 |
| 1995 | 50 |
| 1996 | 50 |
| 1997 | 50 |
| 1998 | 55 |
| 1999 | 55 |
| 2000 | 60 |
| 2001 | 60 |
| 2002 | 65 |
| 2003 | 65 |
| 2004 | 70 |
| 2005 | 70 |
| 2006 | 75 |
| 2007 | 75 |
| 2008 | 80 |
| 2009 | 80 |
| | 0 |

Fig. 14

| Ship Location : Table | | | | | | | | |
|---|---|---|---|---|---|---|---|---|
| Control# | ShipNameCode | Date | City Rate Code | Notes | Sailing Sch Ten | AssumedDate | InPortDate | |
| 168785 | 419 | 02/21/1998 | 3773 | | 48 | ☐ | ☑ | |
| 168815 | 420 | 08/14/1999 | 8048 | | 0 | ☑ | ☑ | |
| 168817 | 420 | 08/15/1999 | 8048 | | 0 | ☑ | ☐ | |
| 168818 | 420 | 08/16/1999 | 8048 | | 0 | ☑ | ☐ | |
| 168819 | 420 | 08/17/1999 | 8048 | | 0 | ☑ | ☐ | |
| 168820 | 420 | 08/18/1999 | 8048 | | 0 | ☑ | ☐ | |
| 168821 | 420 | 08/19/1999 | 8048 | | 0 | ☑ | ☐ | |
| 168822 | 420 | 08/20/1999 | 8048 | | 0 | ☑ | ☐ | |
| 168823 | 420 | 08/21/1999 | 8048 | | 0 | ☑ | ☐ | |
| 168824 | 420 | 08/22/1999 | 8048 | | 0 | ☑ | ☐ | |
| 168825 | 420 | 08/23/1999 | 8048 | | 0 | ☑ | ☐ | |
| 168826 | 420 | 08/24/1999 | 8048 | | 0 | ☑ | ☐ | |
| 168827 | 420 | 08/25/1999 | 8048 | | 0 | ☑ | ☐ | |
| 168828 | 420 | 08/26/1999 | 8048 | | 0 | ☑ | ☐ | |
| 168829 | 420 | 08/27/1999 | 8048 | | 0 | ☑ | ☐ | |
| 168830 | 420 | 08/28/1999 | 8048 | | 0 | ☑ | ☐ | |
| 168831 | 420 | 08/29/1999 | 8048 | | 0 | ☑ | ☐ | |
| 168832 | 420 | 08/30/1999 | 8048 | | 0 | ☑ | ☑ | |
| 168816 | 420 | 08/31/1999 | 5496 | | 0 | ☑ | ☑ | |
| 170183 | 421 | 05/06/1997 | 3159 | | | ☐ | ☑ | |

| ShipCompanies : Table | | | | | |
|---|---|---|---|---|---|
| | ShipCoID | ShipCoName | ShipCoShortName | Work Phone | MealLetter |
| ※ | 1 | sealand | Sealand | | ☑ |
| ※ | 4 | Matson | Matson | | ☑ |
| ※ | 5 | Brusco Tug & Barge | Brusco Tug | | ☑ |
| ※ | 6 | Campbell Towing | Campbell Tow | | ☑ |
| ※ | 7 | Crowley American | Crowley | | ☑ |
| ※ | 8 | Forty Niner Transportation | 49r Trans | | ☑ |
| ※ | 9 | Western Towboat | Western Tow | | ☐ |
| ※ | 10 | Marine Transport | Marine Transport | | ☐ |
| ※ | 11 | Interocean Ugland Mgmt | Interocean | | ☑ |
| ※ | 12 | Osprey-Acomarit Ship Mgmt | Osprey | | ☑ |
| ※ | 13 | Transoceanic Cable | Transoceanic | | ☐ |
| ※ | 14 | Sheridan Transportation | Sheridan | | ☐ |
| ※ | 15 | Energy Transportation | Energy Trans | | ☑ |
| ※ | 16 | Red River & Van Ammeren | Red River | | ☑ |
| ※ | 17 | State of Alaska | Alaska State | | ☑ |
| ※ | 18 | Ensco Marine | Ensco Marine | | ☑ |
| ※ | 19 | Central Gulf Lines | Central Gulf | | ☑ |
| ※ | 20 | Ocean Ships | Ocean Ships | | ☑ |
| ※ | 21 | Lykes Bros | Lykes | | ☑ |
| ※ | 22 | Mormac Marine | Mormac | | ☐ |

Record: 1 of 54

| ShipCoDocs : Table | | | | | |
|---|---|---|---|---|---|
| ShipCoDocID | ShipCoID | DocDesc | ShipCoDocNumb | ShipCoDocPageNumb | ShipCoDocFileName |
| 1 | 4 | Good Letter | | 1 | matson.ppt |
| 2 | 5 | Good Letter | | 1 | Brusco Tug & Barge.ppt |
| 3 | 6 | | | 1 | |
| 4 | 7 | Good Letter | | 1 | Crowley Maritime.ppt |
| 5 | 1 | Good Letter | | 1 | Sea Land.ppt |
| 6 | 8 | Good Letter | | 1 | 49 Transportation Inc.ppt |
| 7 | 9 | Good Letter | | 1 | Western Towboat Co.ppt |
| 8 | 12 | Good Letter | | 1 | Osprey Acomarit Ship Magmt.ppt |
| 9 | 13 | Good Letter | | 1 | Transportation Cable Ship Co.ppt |
| 10 | 18 | Good Letter | | 1 | Ensco Marine Transport.ppt |
| 11 | 20 | Good Letter | | 1 | Ocean Ships Inc.ppt |
| 12 | 22 | Good Letter | | 1 | Mormac Marine Transport.ppt |
| 13 | 23 | Good Letter | | 1 | Int'l Marine Carriers.ppt |
| 14 | 24 | Good Letter | | 1 | |
| 15 | 31 | Good Letter | | 1 | Ocean Chemical Transport.ppt |
| 16 | 25 | Good Letter | | 1 | American Overseas Marine.ppt |
| 17 | 21 | Just Kevin Best | | | |
| 19 | 10 | NO Letter | | | |
| 20 | 11 | NO Letter | | | |
| 21 | 14 | NO Letter | | | |

Fig. 19

| Ship Names : Table | | | |
|---|---|---|---|
| ShipNameCode | Ship Name | ShipColD | ShipEmail |
| 400 | Diamond Shoals | | |
| 401 | Yukon | 41 | |
| 402 | Tippicanoe | 41 | |
| 403 | Rappahannock | 41 | |
| 405 | Beaver State | | |
| 406 | Charter Boats | | |
| 407 | Kalmoku | 4 | |
| 408 | Tellus | | |
| 409 | Argonaut | | |
| 410 | Pride | 1 | |
| 411 | Motivator | 1 | |
| 412 | Value | | |
| 413 | USNS Gordon | | |
| 414 | Charleston | | |
| 416 | test ship 2 | | |
| 417 | Oversean Marilyn | | |
| 418 | Cape Diamond | | |
| 419 | OOCL Innovation | 1 | |
| 420 | Enterprise (Farrell) | | |
| 421 | Pathfinder | | |

Record: |◁| ◁ | 338 | ▷ | ▷| | ▷* | of 338

Alaska (Arco) _282_
PORT LIST FOR THE YEAR OF 1999 _362_
_106_

| Port | Arrival Date | Departure Date |
|---|---|---|
| Cherry Point <Anacortes>, WA | 04/05/1999 | 04/05/1999 |
| Valdez, AK | 04/11/1999 | 04/12/1999 |
| Portland, OR | 04/15/1999 | 04/15/1999 |
| Richmond <Oakland>, CA | 04/16/1999 | 04/17/1999 |
| Valdez, AK | 04/22/1999 | 04/23/1999 |
| El Segundo <L.A.>, CA | 04/28/1999 | 04/28/1999 |
| Valdez, AK | 05/04/1999 | 05/06/1999 |
| Anacortes, WA | 05/07/1999 | 05/07/1999 |
| Ulsan <Pusan>, South Korea | 05/21/1999 | 06/10/1999 |

Task Update Maintenance

User ID: Marty

| Difficulty | Date Created | Client Name / Number | Tax Year | Task | Notes |
|---|---|---|---|---|---|
| Fast Track | 06/28/1999 | Rascon, Martin / S739 | 1998 | Return Now Assembled & Ready to Sign | |
| Fast Track | 03/01/1999 | Smith Georgean / P615 | 1998 | Return Appears to ve Near Completion | |
| Fast Track | 03/07/2000 | Denman, Jesse / R616 | 1999 | Return Now Signed & Moved to "Taxdone" | |
| Fast Track | 11/01/2000 | Thomas, Robert / S1126 | 1999 | Prepare Amended Return ONLY | |
| Fast Track | 11/01/2000 | Thomas, Robert / S1126 | 1998 | Prepare Amended Return ONLY | |
| Fast Track | 11/01/2000 | Thomas, Robert / S1126 | 1997 | Prepare Amended Return ONLY | |
| Fast Track | 11/13/2000 | McDonald, Joe / S1133 | 1999 | Prepare Amended Return ONLY | |
| Fast Track | 11/13/2000 | McDonald, Joe / S1133 | 1998 | Prepare Amended Return ONLY | |
| Fast Track | 11/13/2000 | McDonald, Joe / S1133 | 1997 | Prepare Amended Return ONLY | |
| Fast Track | 11/15/2000 | Single, George / S797 | 1997 | Prepare Amended Return ONLY | |
| Fast Track | 12/06/2000 | Niem, Klaus / S1148 | 1998 | Return Appears to be Near Completion | |
| Fast Track | 09/15/2000 | Vickery, Oscar / P36 | 1999 | Prepare Amended Return ONLY | Yes |
| Fast Track | 10/14/2000 | Parry, Ralph / 185 | 1999 | Return Now Signed & Moved to "Taxdone" | |

Record: 1 of 46

Project Assignment — 386

| | | | | |
|---|---|---|---|---|
| Client #: | 14 | Find/EXISTING Project: | | |
| Project Name: | Tax Return | | | |
| Start Date: | 02/05/1998 | Invoice #: | | Tax Year: 1999 |
| Difficulty: | Fast Track | Status | Completed | Paid: Yes |
| Travel Status: | Loaded Sets Alre | File Location: File Cabinet | | Location Date: 10/09/2000 |
| | | Dir. Location: Taxdone | | Directory Date: 01/24/2001 |

Salomonsen, Jonny — 406
418

Tabs: Task List | Priority/Notes | Extentions | New Information | Delays | Sailors/Letters

390

| Date | Task Result | Comments | Done By |
|---|---|---|---|
| 2/06/1998 | Tax Info Received by U.S. Mail - NO Money | Taxpayer lived in Manilla | Robert |
| 2/06/1998 | Appears to be a Complex Out-of-State Return | Pilot Based in Manilla | Robert |
| 2/06/1998 | No W-2, Address, etc Information Received | | Robert |
| 2/06/1998 | T/P and/or Spouse is a Pilot | | Robert |
| 2/18/1998 | Traveled Schedule Now Completely Loaded | 2/18 Travel rec'd | |
| 2/18/1998 | Initial Travel Letter Done - Per Diem Unknown | | Robert |
| 2/19/1998 | All Easy Interest Inc Items Now Loaded | | Robert |
| 2/19/1998 | No Dividend Income Items | | |
| 2/18/1998 | No Schedule D - Stock Sales | | Robert |
| 3/24/1998 | All Tax Organizer Schedule A Info Now Loaded | | Marty |

Record: 14    1 ▶ ▶| ▶* of 16

Add NEW Client | Delete Entire Project | Add New Project | OK

Remove Last Task

Fig. 28A

Amended Tax Return – Schedule A Supporting Statement -
Name: _____86_____ SSN: _____

Line 2. Taxpayer is a FULL-TIME MERCHANT SAILOR whose original tax preparer did not claim the taxpayer's "DEEMED SUBSTANTIATED" Out-of-Town Travel Expenses now available to ALL Merchant Sailors. Explanation & Substantiation as follows: —246

Line 2. Taxpayer, is a FULL-TIME MERCHANT SAILOR who prepared his own tax return and did not claim his own "DEEMED SUBSTANTIATED" Out-of-Town Travel Expenses now available to ALL Merchant Sailors. Explanation & Substantiation as follows: —250

As a MERCHANT SAILOR, the taxpayer was assigned to work on a Cargo Ship during 1999 that was traveling between ports located around the Pacific Ocean and therefore qualifies per attached Rev Proc 98-64's "Transportation Industry Employees" and attached *MARIN JOHNSON TAX COURT DECISION* to compute his DEEMED SUBSTANTIATED Out-of-Town Travel Incidental Costs by using attached Pub 1542's Non-Foreign OCONUS Rates, Foreign OCONUS Rates and Domestic CONUS Rates for EACH CITY and their related incidental rates as follows:

—48 --------

The *JOHNSON CASE* now allows ALL Sailors to also claim their
Other Travel Expenses per *IRS Notice 95-50* which totals:     xxx.

As a MERCHANT SAILOR, taxpayer was *forced* by his Union regulations to personally show up at his Union Hall to look for his next work assignment. He was NOT ALLOWED to simply phone his Union Hall to see what new jobs were currently available. Per attached Tax Research, his auto mileage and possibly other travel-related costs back and forth to his Union Hall looking for work are FULLY DEDUCTIBLE as follows:

--------

Total Tax Court & IRS Allowed Sailor Travel     266 ——— xxx.
=======

✓ *NO EMPLOYER PROVIDED TRAVEL REIMBURSEMENTS PER COMPANY LETTER.*

✓ See attached Official Ship's "Ports-of-Call" Travel Schedule.

✓ See Sailor Day-by-Day Travel & *Tax Court Established* Daily Rates.

✓ See attached Official U.S. Coast Guard Sailor's Travel Documents.

✓ See attached *Tax Court Case* – Johnson v. Comm., 115 T.C. 16 (2000)

✓ See attached I.R.S. Revenue Procedure 98-64 regarding Sailor Travel.

✓ See attached Tax Research Regarding Sailor Travel to Union Halls.

✓ See attached Official IRS Non-Foreign OCONUS Rates for each city listed.

✓ See attached Official IRS Foreign OCONUS Rates for each city listed.

✓ See attached Official IRS Domestic CONUS Rates for each city listed.

✓ See attached Federal Travel Regulation – Appendix B M&IE Breakdown.

Fig. 28B

```
Amended Tax Return – Schedule A Supporting Statement - 1999
Name:  George C. Antunovich                                    SSN:  618-40-3471
```

Line 2.   Taxpayer is a FULL-TIME MERCHANT SAILOR whose original tax preparer did not claim the taxpayer's "DEEMED SUBSTANTIATED" Out-of-Town Travel Expenses now available to ALL Merchant Sailors.   Explanation & Substantiation as follows:

As a MERCHANT SAILOR, the taxpayer was assigned to work on a Cargo Ship during 1999 that was traveling between ports located around the Pacific Ocean and therefore qualifies per attached Rev Proc 98-64's "Transportation Industry Employees" and attached _MARIN JOHNSON TAX COURT DECISION_ to compute his DEEMED SUBSTANTIATED Out-of-Town Travel Incidental Costs by using attached Pub 1542's Non-Foreign OCONUS Rates, Foreign OCONUS Rates and Domestic CONUS Rates for EACH CITY and their related incidental rates as follows:

```
   20 Days x  $17  ($85) Djibouti City, Djibouti              = $340
   12 Days x  $15  ($77) Jeddah, Saudi Arabia                 = $180
   15 Days x  $11  ($56) Port Suez <Port Said>, Egypt         = $165
    6 Days x  $14  ($69) Port Sudan <Khartoum>, Sudan         =  $84
   19 Days x   $2  ($38) Corpus Christi, Texas                =  $38
   19 Days x   $2  ($42) Bayonne <Newark>, New Jersey         =  $38
   16 Days x   $2  ($42) Houston, Texas                       =  $32
    9 Days x   $2  ($38) Bucksport <Bar Harbor>, Maine        =  $18
    9 Days x   $2  ($42) Elizabeth <Newark>, New Jersey       =  $18
    7 Days x   $2  ($38) Savannah, Georgia                    =  $14
    6 Days x   $2  ($42) Baytown <Galveston>, Texas           =  $12
    6 Days x   $2  ($46) New York City <Manhattan>, New York  =  $12
    5 Days x   $2  ($38) Tampa, Florida                       =  $10
    4 Days x   $2  ($46) Paulsboro <Philadelphia>, PA         =   $8
    4 Days x   $2  ($42) Port Everglades <Miami>, Florida     =   $8
    2 Days x   $2  ($46) San Pedro <L.A.>, California         =   $4
    1 Day  x   $2  ($34) Port Canaveral <Cocoa Beach>, Florida=   $2
    1 Day  x   $2  ($38) Oakland, California                  =   $2
    1 Day  x   $2  ($34) Cape Canaveral <Cocoa Beach>, Florida=   $2
                                                                --------
    Total Sailor Travel Costs Allowed per OCONUS & CONUS Rates   $987.

The JOHNSON CASE now allows ALL Sailors to also claim their
Other Travel Expenses per IRS Notice 95-50 which totals:          xxx.
                                                                --------
    Total Tax Court & IRS Allowed Sailor Travel                   xxx.
                                                                ========
```

✓ NO EMPLOYER PROVIDED TRAVEL REIMBURSEMENTS PER COMPANY LETTER.

✓ See attached Official Ship's "Ports-of-Call" Travel Schedule.

✓ See Sailor Day-by-Day Travel & _Tax Court Established_ Daily Rates.

✓ See attached Official U.S. Coast Guard Sailor's Travel Documents.

✓ See attached _Tax Court Case_ - Johnson v. Comm., 115 T.C. 16 (2000)

✓ See attached I.R.S. Revenue Procedure 98-64 regarding Sailor Travel.

✓ See attached Tax Research Regarding Sailor Travel to Union Halls.

✓ See attached Official IRS Non-Foreign OCONUS Rates for _each_ city listed.

✓ See attached Official IRS Foreign OCONUS Rates for _each_ city listed.

✓ See attached Official IRS Domestic CONUS Rates for each city listed.

Fig. 28C

Supplemental Pilot Travel Schedule - 2000
Name: Frederick M. Amicangioli                    SSN: 019-46-5487

Schedule A
Line 20 - Unreimbursed Employee Expenses

Description                                                                                            Amount
--------------------------------------------------------------------------------------------------------------
Taxpayer is an AIRLINE PILOT assigned to fly aircraft around the world
and therefore qualifies per attached **Rev Proc 2000-9's "Transportation
Industry Employees" and I.R.S. Pub 463's "Travel Expenses"** to compute
his DEEMED SUBSTANTIATED Out-of-Town Travel Costs by using attached Pub
1542's Foreign OCONUS Rates and Domestic CONUS Rates for EACH CITY as
follows:

```
    21  Days  x  $131   Tokyo, Japan         →  meals + incidentals  =   $2,751.
    23  Days  x  $115   Hong Kong, China     →  rate only            =   $2,645.
    55  Days  x   $46   Los Angeles, California                      =   $2,530.
    54  Days  x   $46   Minneapolis, Minnesota                       =   $2,484.
    19  Days  x   $96   London, United Kingdom                       =   $1,824.
    26  Days  x   $68   Anchorage, Alaska                            =   $1,768.
     5  Days  x  $295   Hong Kong, China  → shows full rate          =   $1,475.
    21  Days  x   $44   Sigonella, Italy                             =     $924.
    14  Days  x   $65   Honolulu <Oahu>, Hawaii                      =     $910.
    12  Days  x   $64   Seoul, South Korea                           =     $768.
     7  Days  x   $99   Taipei, Taiwan                               =     $693.
     7  Days  x   $78   Frankfurt, Germany                           =     $546.
     7  Days  x   $70   New Delhi, India                             =     $490.
     6  Days  x   $73   Rota <Madrid>, Spain                         =     $438.
     6  Days  x   $70   Prestwick <Glasgow>, Scotland                =     $420.
    11  Days  x   $38   Atlanta, Georgia                             =     $418.
     5  Days  x   $42   Denver, Colorado                             =     $210.
     4  Days  x   $46   San Francisco, California                    =     $184.
     2  Days  x   $82   Amsterdam, Netherlands                       =     $164.
     2  Days  x   $32   Wake Island, Marshall Islands                =      $64.
                                                                         --------
Total Pilot Travel Costs Allowed per OCONUS & CONUS Rates                21,706.
LESS EMPLOYER PROVIDED REIMBURSEMENTS                                    <6,000>
                                                                         --------
Pilot Travel Allowance in Excess of Reimbursements                       15,706.
Dept of Transportation's Pilot "Hours of Service" Rate                   x  60%
                                                                         --------
Net Pilot DEEMED SUBSTANTIATED Travel Costs                               9,424.
                                                                         ========
```

VEHICLE USE TABLE

| TAXPAYER NAME | SOCIAL SECURITY # | VEHICLE ID # | START DATE | END DATE |
|---|---|---|---|---|
| SMITH, JOHN | 461-53-2147 | G123347890 | 6/1/01 | 7/7/01 |
| BURNS, ROBERT | 843-51-6479 | 234118750 | 7/15/01 | 8/12/01 |
| ... | ... | ... | ... | ... |

*FIG. 30*

☐ DATA COLLECTION SYSTEM

| GPS RECEIVER # | DATE | TIME | LATTITUDE | LONGTITUDE |
|---|---|---|---|---|
| AB4210 | 6/1/01 | 12:00 | 48°, 20' | 61°, 0' |
| AB4210 | 6/1/01 | 12:30 | 48°, 30' | 61°, 20' |
| XY1234 | 7/15/01 | 1:15 | 34°, 15' | 34°, 10' |
| . . . | . . . | . . . | . . . | . . . |

*FIG. 31*

RECEIVER USE TABLE

| TAXPAYER NAME | SOCIAL SECURITY # | GPS RECEIVER # | START DATE | END DATE |
|---|---|---|---|---|
| SMITH, JOHN | 461-53-2147 | AB4210 | 6/1/01 | 7/7/01 |
| BURNS, ROBERT | 843-51-6479 | XY1234 | 7/15/01 | 8/12/01 |
| ... | ... | ... | ... | ... |

FIG. 33

INCOME TAX PREPARATION SYSTEM FOR TRAVELING TAXPAYERS

RELATED APPLICATION

The instant application is a Continuation-in-Part of U.S. application Ser. No. 09/934,629, filed Aug. 21, 2001 now U.S. Pat. No. 6,978,254.

FIELD OF INVENTION

The invention pertains to automated income tax preparation systems. More particularly, the invention relates to tax preparation systems designed to handle the extensive and complex calculations relating to taxpayers who travel regularly as part of their employment, such as merchant seamen, airline pilots, flight attendants, truckers and bus drivers.

BACKGROUND OF THE INVENTION

Various types of systems have been developed for handling travel itineraries and income tax preparation; incorporating a number of different technologies. U.S. Pat. No. 6,009,408 issued to Buchanan is directed to automated processing of travel related expenses. Computer systems associated with the Internal Revenue Service can be linked with the travel information processing system by a suitable communication subsystem collects information supporting tax returns from customers. Because the taxable income of a particular customer may often be reduced by the amount of travel related expenses incurred by travelers associated with customer, customers may request that receipt information kept in travel information processing system be sent to IRS system.

U.S. Pat. No. 5,237,499 issued to Garback, is directed to a computer travel planning system. A computer based system for processing travel requests directed to a specific venue from individual members of a sponsored group is provided. The system comprises a database containing a venue file including information regarding the specific venue, a group member file for each individual member of the group, a travel policy file containing information on pre-selected vendors of various travel services, and a city code file containing codes corresponding to a plurality of city airport locations. The database includes a travel policy file that contains information on pre-selected airline carriers, pre-selected room accommodation providers, and pre-selected ground transportation providers.

U.S. Pat. No. 5,948,040, issued to DeLorme et al. is directed to a travel reservation information and planning system. Menus generated by this system enable flexible user inquiries accessing selectable geographic, topical, temporal and transactional data records and relational processing. Some menus provide further capabilities: e.g., routing, topical searching, searches of event calendars, almanacs, appointment books, related itinerary schedule, trip budgeting issues, and travel arrangement availabilities for other goods/services offers. An online computer aided routing system enables input of selectable travel origin, destination, and waypoints to compute travel route, available transportation services, costs, options, and schedules. The system provides the capability to determine the mode or modes of travel required to reach each destination, make the reservations associated with the travel, find the accommodations and activities available, plus take advantage of diverse, special offers for goods and services from participating providers.

U.S. Pat. No. H1,830 issued to Petrimoulx et al. is directed to a system for use-tax determination. The system relates to computer implemented tax preparation and tax submission accounting, and the system is directed to providing a system that enables use-tax accrual and determination. The system provides a machine for use-tax determination which has: (A) transaction record acquisition logic for acquiring transaction information characterizing purchases of goods and services and generating transaction records; (B) use-tax logic; and (C) tax rate acquisition logic for acquiring tax jurisdiction codes, at least one inclusive accounting group registry respective to taxes, and tax information respective to the tax jurisdiction codes for plurality of state jurisdictions, and generating a data schema with data elements describing the inclusive accounting group registry, tax jurisdiction codes, and tax information.

While other variations exist, the above-described systems for travel planning and tax return preparation are typical of those encountered in the prior art. It is an objective of the present invention to provide a system that can determine the per diem expense allowances for a taxpayer required to stay overnight for work purposes in any city identified by the Internal Revenue Service. It is a further objective to provide a means for determining the cities visited by a merchant seaman based upon the identity of his ship and his dates of employment upon it. It is a still further objective of the invention to provide means to prepare complete printed tax returns including a printout of the travel locations with appropriate rates for the taxpayer, relevant code sections underlined, etc. It is yet a further objective to provide an accurate system that will permit preparation of travel-related tax returns with substantially reduced manual effort on the part of tax preparation personnel.

While some of the objectives of the present invention are disclosed in the prior art, none of the inventions found include all of the requirements identified.

SUMMARY OF THE INVENTION

The present invention addresses all of the deficiencies of prior art tax return preparation inventions and satisfies all of the objectives described above.

(1) A system for determining travel deductions for taxpayers who stay overnight in cities remote from their homes as part of their employment, includes the following components. A city rate table is provided. The city rate table identifies allowed per diem expense rates for a given tax year for a plurality of cities as identified by a city code. Means are provided for inputting and maintaining data in the table. Means are provided for inputting cities visited and durations of stay for a taxpayer. Means are provided for inputting expense reimbursements received from the taxpayer's employer. Means are provided for calculating a total of all per diem expenses based upon the city rate table and the input cities and number of days of stay in the cities. Means are provided for offsetting the reimbursements against the total to determine an incidental expense allowance.

(2) In a variant of the invention, a client information table is provided. The client information table includes a taxpayer's name, address, zip code, Social Security number and a work code. A USA States table is provided. The States table includes each state's name, a state ID code, a lower 48 state code, and an IRS center code. The city rate table also includes a tax year, a city code, combined meal and incidental rate, full rate, and high cost city code. A city name table is provided. The city name table includes the city code, city, state ID code, and country name. Supporting schedules are provided. The supporting schedules merge data from the client information table, the USA States table, and the city rate table with the input cities and durations of stay for the taxpayer. Means are provided for inputting and maintaining data in each of the tables.

(3) In a further variant, an airport table is provided. The airport table includes an airport identifier code, an airport name, city code and country name. When a location is input using either of an airport identifier code and an airport name, the appropriate city is determined for use in the supporting schedules.

(4) In yet a further variant of the invention, an airline table is provided. The airline table includes an airline name and an airline ID number. The airline table permits data merged with the client information table to be sorted by airline.

(5) In still a further variant, an IRS service centers table is provided. The IRS service centers table includes an IRS mailing address for tax return submission, an IRS mailing address for submitting estimated tax payments and an IRS ID code. The IRS service centers table is merged with the supporting schedules to determine an address to mail either of a taxpayer's federal tax return and a taxpayer's federal estimated tax payments to.

(6) In another variant, a state service centers table is provided. The state service centers table includes a state income tax mailing address for tax return submission, a state mailing address for submitting estimated tax payments and a state ID code. The state service centers table is merged with the supporting schedules to determine an address to mail either of a taxpayer's state tax return and a taxpayer's state estimated tax payments to.

(7) In still another variant of the invention, a zip code table is provided. The zip code table includes a five-digit zip code, a corresponding city, county and state. The zip code table is used to verify the zip code input in the client information table and to provide the taxpayer's county. The zip code table is used to generate mailing labels for the taxpayer's state and federal tax returns.

(8) In yet another variant, an attachments table is provided. The attachments table stores links to IRS and state tax publication pages, tax year and work code. The attachments table is compared to the client information table to determine appropriate publication pages to include with the taxpayer's tax returns.

(9) In still another variant, a meal rate percent table is provided. The meal rate percent table includes the tax year and meal rate percent. The meal rate percent is used to reduce the meal rate allowed.

(10) In yet another variant of the invention, further supporting schedules display a taxpayer's travel computations and provides means to calculate the taxpayer's travel deduction based upon the plurality of travel calculation rates allowed by the IRS. The further supporting schedules provide means to enter the expense reimbursements received from the taxpayer's employer. The further supporting schedules provide means to optionally decline use of the meal rate percent table to reduce the meal rate allowed. The further supporting schedules provide means to print out IRS publications and revenue procedures related to the taxpayer's occupation. The further supporting schedules provide means to print out an IRS rate sheet for each city visited. The rate sheets are printed in descending order based upon the taxpayer's travel deduction for each city visited with the city highlighted on each sheet.

(11) In a further variant a plurality of customizable document templates are provided. The templates are selected by the system based upon tax year, work code, combined meal and incidental rate, incidental portion and full rate applied and an amended return code. The templates include a taxpayer's name, Social Security number, tax year, occupation description, legal justification for claiming travel deductions, each city visited, applicable deduction for the city, a total travel deduction figure, expense reimbursements received from the taxpayer's employer, meal rate percent for the tax year, a meal rate percent reduction amount and a remaining amount available for deduction.

(12) In still a further variant, a ship location table is provided. The ship location table includes city rate codes for each day of a tax year for a plurality of ship name codes. Means are provided for inputting names of ships on which a taxpayer has worked and starting and ending dates for work on each of the ships. Means are provided for determining locations and durations of stay for the taxpayer based upon the ship location table and the input ship names and starting and ending dates for work on each of the ships.

(13) In yet a further variant, a shipping company documents table is provided. The shipping company documents table includes a shipping company ID code and a pointer to a shipping company document file name. A shipping companies table is provided. The shipping companies table including the shipping company ID code and a shipping company name. Means are provided for printing the shipping company document.

(14) In still a further variant, a ship names table is provided. The ship name table includes a ship name code, the ship name, the shipping ID code and each ship's e-mail address.

(15) In another variant of the invention, other supporting schedules merge the ships location table and the city rate table to provide meal and incidental rates and full rates for each city visited. Means are provided for determining the highest meal and incidental rates and full rates applicable for taxpayers traveling between cities for more than one day.

(16) In still another variant, a series of data entry templates is provided. The templates include the ship locations recorded in the ship location table for names of ships associated with each shipping company name. The templates permit rapid entry of ship locations for ships following identical routes, the routes having different starting dates.

(17) In yet another variant, means are provided for reviewing the travel start and end dates for any input ship name and tax year.

(18) In a further variant, a merchant sailor schedule table is provided. The merchant sailor schedule table includes the taxpayer's name, the ship name, the trip start date and the trip end date as recorded on the taxpayer's U.S. Coast Guard Discharge Papers. The merchant sailor schedule table is used in conjunction with the ship location table to provide the incidental portion of meal rates and full rates for each city visited by the taxpayer in a tax year.

(19) In still a further variant of the invention, means are provided for printing a ports of call statement illustrating the location of a ship for each day of a tax year.

(20) In yet a further variant, means are provided for accessing the client information table and the merchant sailor schedule table to provide a listing of all of the taxpayers associated with any ship during a tax year and the means for contacting the taxpayers.

(21) In another variant, means are provided for displaying a chronological listing of all of the U.S. Coast Guard Discharge Paper data input for the taxpayer for a tax year to the merchant sailor schedule table to determine if any travel days are unaccounted for.

(22) In another variant of the invention, means for identifying all tasks associated with the preparation of a tax return are provided as are means for identifying all results associated with the performance of the tasks. Means are provided for linking the results to a subsequent task. Means are provided for determining the skill level of a tax preparation worker required to complete each task as are means for identifying the skill level of each tax preparation worker. Means are provided for assigning each uncompleted task to workers of the required skill level as are means for indicating which worker will work on each task. Means are provided for indicating completion of each task for removal from the system.

(23) In still another variant, the means for inputting cities visited and durations of stay for a taxpayer further includes a global positioning system (GPS) receiver affixed to a taxpayer's vehicle. The vehicle has a unique vehicle identification number and the receiver has a unique receiver code. The GPS receiver receives location waypoints for the receiver. A GPS receiver correlation table is provided. The correlation table includes the vehicle identification number and the receiver code. A vehicle use table is provided. The vehicle use table includes the taxpayer's name, Social Security number, vehicle identification numbers and dates of use for each of the vehicle identification numbers. Means are provided for inputting and maintaining data in the tables.

A data relay is provided. The data relay passes location waypoints received from the coded GPS receiver to a data collection system at predetermined intervals. A mapping system is provided. The mapping system accesses the data collection system and the city rate table and determines and stores a highest per diem cost city code within a predetermined distance of the waypoints during a given day for each of the receiver codes. A data analysis system is provided. The data analysis system accesses the GPS receiver correlation table, the vehicle use table and the mapping system to determine and store the highest per diem cost city code for the taxpayer for each day of a tax year.

(24) In a further variant of the invention, a global positioning system (GPS) receiver is carried by a traveling taxpayer. The receiver has a unique receiver code. The GPS receiver receives location waypoints for the receiver. A receiver use table is provided. The receiver use table includes the taxpayer's name, Social Security number, GPS receiver code and dates of use for each of the receiver codes. Means are provided for inputting and maintaining data in the tables. A data relay is provided. The data relay passes location waypoints received from the coded GPS receiver to a data collection system at predetermined intervals. A mapping system is provided. The mapping system accesses the data collection system and the city rate table and determines and stores a highest per diem cost city code within a predetermined distance of the waypoints during a given day for each of the receiver codes. A data analysis system is provided. The data analysis system accesses the GPS receiver correlation table, the receiver use table and the mapping system to determine and store the highest per diem cost city code for the taxpayer for each day of a tax year.

(25) In yet another variant, a client information table is provided. The information table includes a taxpayer's name, address, zip code, Social Security number and a work code. A USA States table is provided. The States table includes each state's name, a state ID code, a lower 48 state code, and an IRS center code. The city rate table further includes a tax year, a city code, combined meal and incidental rate, full rate, and high cost city code. A city name table is provided. The city name table includes the city code, the city, the state ID code, and a country name. Supporting schedules are provided. The supporting schedules merging data from the client information table, the USA States table, and the city rate table with the input cities and durations of stay for the taxpayer. Means are provided for inputting and maintaining data in each of the tables.

(26) In a further variant, an IRS service centers table is provided. The IRS service centers table includes an IRS mailing address for tax return submission, an IRS mailing address for submitting estimated tax payments and an IRS ID code. The IRS service centers table is merged with the supporting schedules to determine an address to mail either of a taxpayer's federal tax return and a taxpayer's federal estimated tax payments to.

(27) In still a further variant, a state service centers table is provided. The state service centers table includes a state income tax mailing address for tax return submission, a state mailing address for submitting estimated tax payments and a state ID code. The state service center table is merged with the supporting schedules to determine an address to mail either of a taxpayer's state tax return and a taxpayer's state estimated tax payments to.

(28) In yet a further variant, a zip code table is provided. The zip code table includes a five-digit zip code, a corresponding city, county and state. The zip code table is used to verify the zip code input in the client information table and to provide the taxpayer's county. The zip code table is used to generate mailing labels for the taxpayer's state and federal tax returns.

(29) In another variant of the invention, an attachments table is provided. The attachments table stores links to IRS and state tax publication pages, tax year and work code. The attachments table is compared to the client information table to determine appropriate publication pages to include with the taxpayer's tax returns.

(30) In yet another variant, a meal rate percent table is provided. The meal rate percent table includes the tax year and meal rate percent. The meal rate percent is used to reduce the meal rate allowed.

(31) In still another variant, further supporting schedules are provided. The further supporting schedules display a taxpayer's travel computations and provide means to calculate the taxpayer's travel deduction based upon the plurality of travel calculation rates allowed by the IRS. The further supporting schedules provide means to enter the expense reimbursements received from the taxpayer's employer. The further supporting schedules provide means to optionally decline use of the meal rate percent table to reduce the meal rate allowed. The further supporting schedules provide means to print out IRS publications and revenue procedures related to the taxpayer's occupation. The further supporting schedules provide means to print out an IRS rate sheet for each city visited. The rate sheets are printed in descending order based upon the taxpayer's travel deduction for each city visited with the city highlighted on each sheet.

(32) In yet another variant, a plurality of customizable document templates is provided. The templates are selected by the system based upon tax year, work code, combined meal and incidental rate, incidental portion and full rate applied and an amended return code. The templates includes a taxpayer's name, Social Security number, tax year, occupation description, legal justification for claiming travel deductions, each city visited, applicable deduction for the city, a total travel deduction figure, expense reimbursements received from the taxpayer's employer, meal rate percent for the tax year, a meal rate percent reduction amount and a remaining amount available for deduction.

(33) In a further variant, the data relay is a transmitter co-located with the GPS receiver.

(34) In still a further variant, the data collection system is a computerized data base receiving and storing the location waypoints received from the coded GPS receiver at the predetermined intervals.

(35) In a final variant, the mapping system further includes a distance adjuster. The distance adjuster permits a user to set the predetermined distance at which a city will be considered an overnight stop for a taxpayer.

An appreciation of the other aims and objectives of the present invention and an understanding of it may be achieved by referring to the accompanying drawings and the detailed description of a preferred embodiment.

DESCRIPTION OF THE DRAWINGS

FIG. 1 is a schematic view of the City Rates Table used in the preferred embodiment of the invention;

Figure 2:
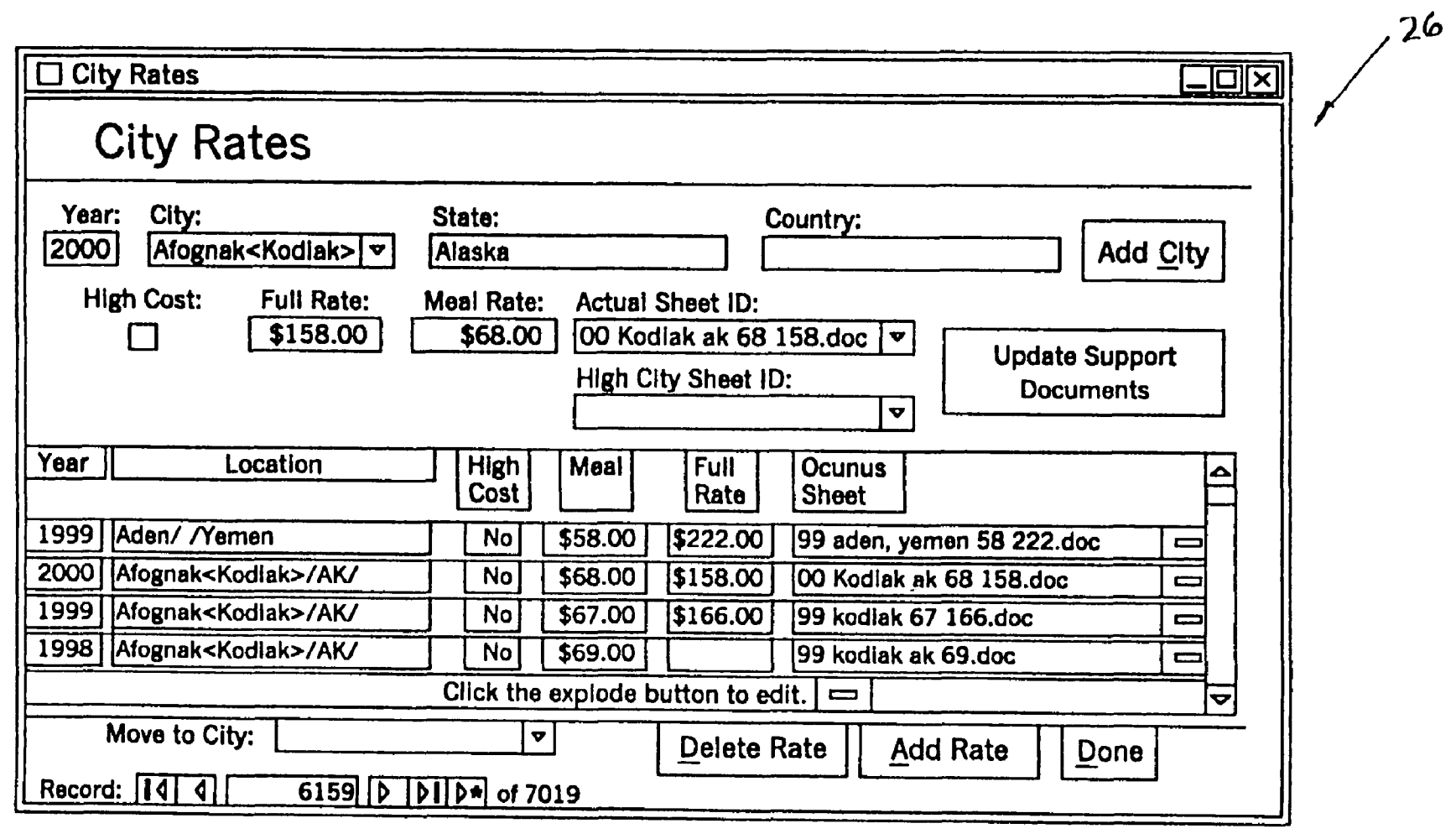

FIG. 2 is a schematic view of the City Rates input screen;

FIG. 3 is a schematic view of the City Schedule input screen;

FIG. 5 is a schematic view of the client information table input screen;

FIG. 6 is a schematic view of the USA States table;

FIG. 6A is a schematic view of the City Name table;

FIG. 7 is a schematic view of the Airports table;

FIG. 8 is a schematic view of the Airlines table;

FIG. 9 is a schematic view of IRS Service Centers table;

FIG. 10 is a schematic view of the State Service Centers table;

FIG. 11 is a schematic view of the Zip code table;

FIG. 12 is a schematic view of the Attachment input screen;

FIG. 14 is a schematic view of the Meal Rate Percent table;

FIG. 15 is a schematic view of the Ship Location table;

FIG. 16 is a schematic view of the Merchant sailor Schedule input screen;

FIG. 17 is a schematic view of the Ship Companies table;

FIG. 18 is a schematic view of one of the supporting schedules used to view sailor trip start and end dates;

FIG. 19 is a schematic view of the Ship Company Documents table;

FIG. 20 is a schematic view of the Ship Names table;

FIG. 22 is a schematic view of the Sailing Schedule template screen;

FIG. 23 is a schematic view of the Ports of Call List for a ship for a tax year;

Figure 24:
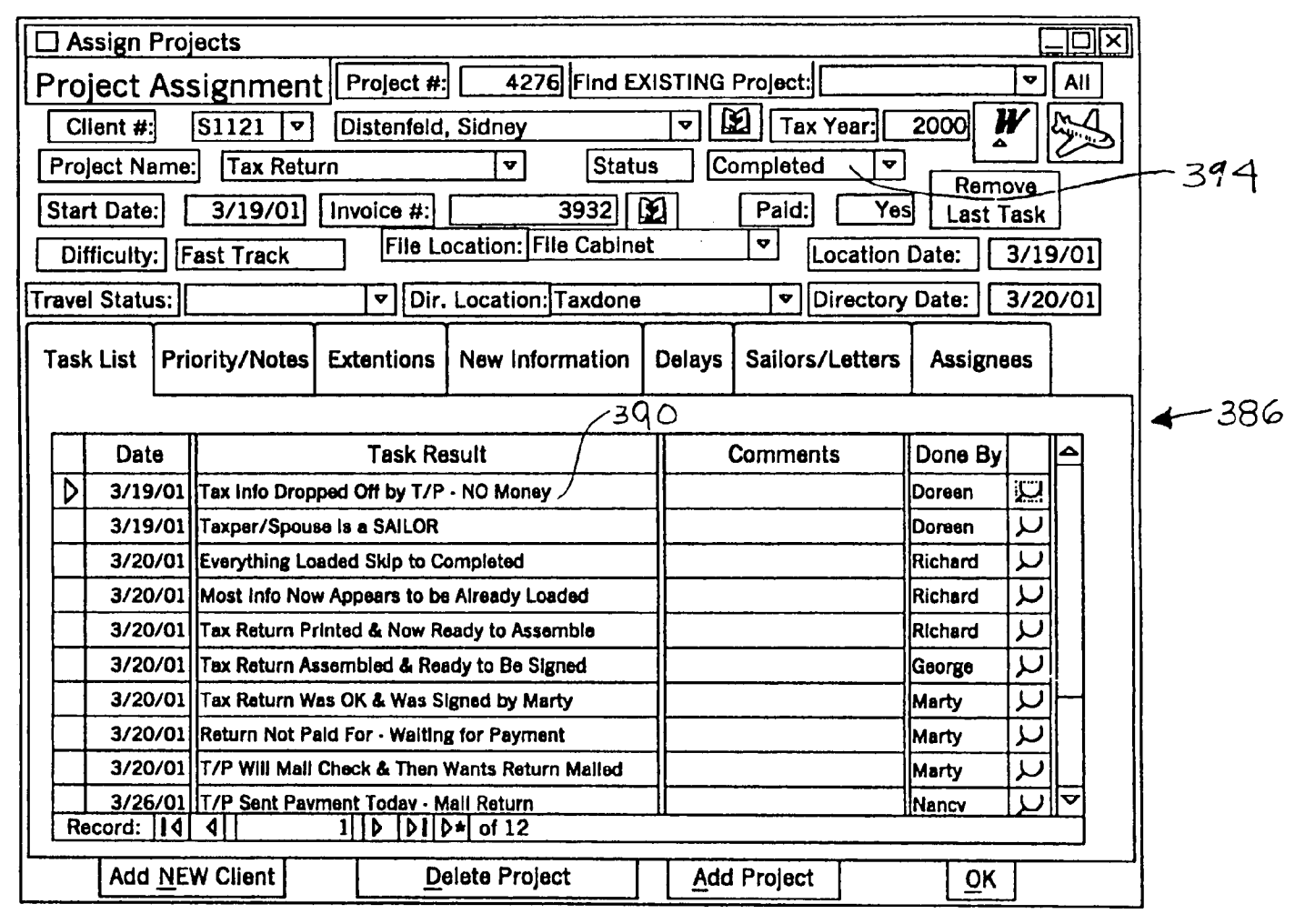

FIG. 24 is a schematic view of the project task assignment input screen showing task results;

FIG. 25 is a schematic view of the task update maintenance input screen showing addition of new tasks;

Figure 26:
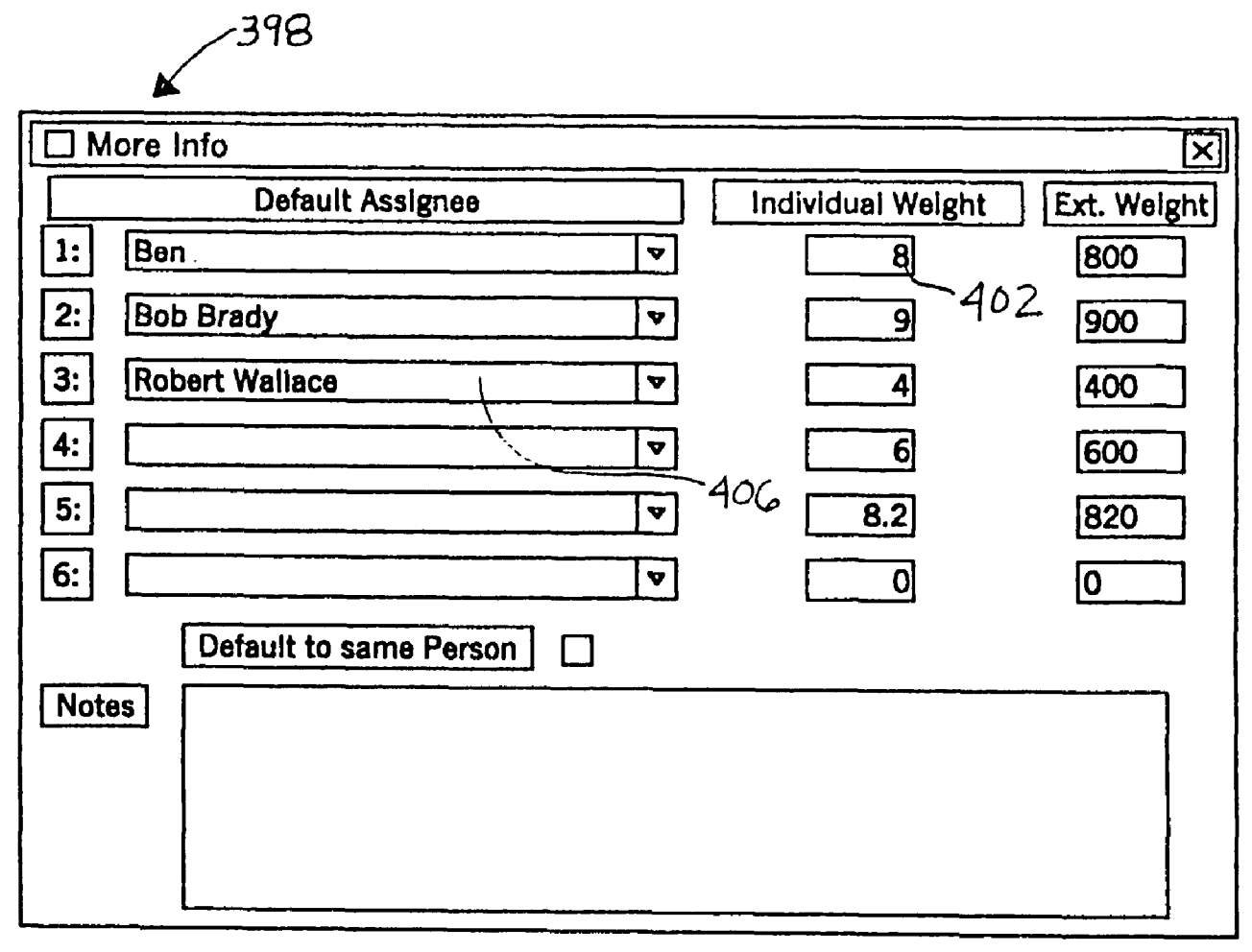

FIG. 26 is a schematic view of a skill level assignment input screen;

FIG. 27 is a schematic view of the project task assignment input screen showing task results and comments;

FIG. 28A is a customizable template for a merchant sailor;

FIG. 28B is a customizable template for a merchant sailor for which data has been entered;

FIG. 28C is a customizable template for an airline pilot for which data has been entered;

FIG. 30 is a schematic view of the Vehicle Use table;

FIG. 31 is a schematic view of data stored in the Data Collection System;

FIG. 33 is a schematic view of the Receiver Use table.

DETAILED DESCRIPTION OF THE PREFERRED EMBODIMENT (1) FIGS. 1-4 illustrate a system for determining travel deductions for taxpayers who stay overnight in cities remote from their homes as part of their employment 10 that includes the following components. A city rate table 14 is provided. The city rate table 14 identifies allowed per diem expense rates 18 for a given tax year 106 for a plurality of cities 48 as identified by a city codes 110. Means 26 are provided for inputting and maintaining data in the table 14. Means 30 are provided for inputting cities visited 48 and durations of stay 38 for a taxpayer 42. Means 46 are provided for inputting expense reimbursements 50 received from the taxpayer's employer. Means 54 are provided for calculating a total of all per diem expenses 58 based upon the city rate table 14 and the input cities 48 and number of days of stay 38 in the cities 48. Means 62 are provided for offsetting the reimbursements 50 against the total 58 to determine an incidental expense allowance 66.

(2) In a variant of the invention, as illustrated in FIG. 5, a client information table 70 is provided. The client information table 70 includes a taxpayer's name 42, address 74, zip code 78, Social Security number 82 and a work code 86. A USA States table 90 is provided as illustrated in FIG. 6. The States table 90 includes each state's name 94, a state ID code 190, a lower 48 state code 98, and an IRS center code 102. The city rate table 14 as illustrated in FIG. 1, also includes a tax year 106, a city code 110, combined meal and incidental rate 114, full rate 118, and high cost city code 122. As illustrated in FIG. 6A, a city name table is provided. The city name table includes city code 110, city 48, state ID code 190, and country name 56. Supporting schedules 126 as illustrated in FIGS. 4 and 18, are provided. The supporting schedules 126 merge data from the client information table 70, the USA States table 90, and the city rate table 14 with the input cities 48 and durations of stay 38 for the taxpayer 42. Means are provided for inputting and maintaining data in each of the tables 14, 70, 90, 126.

Figure 4:
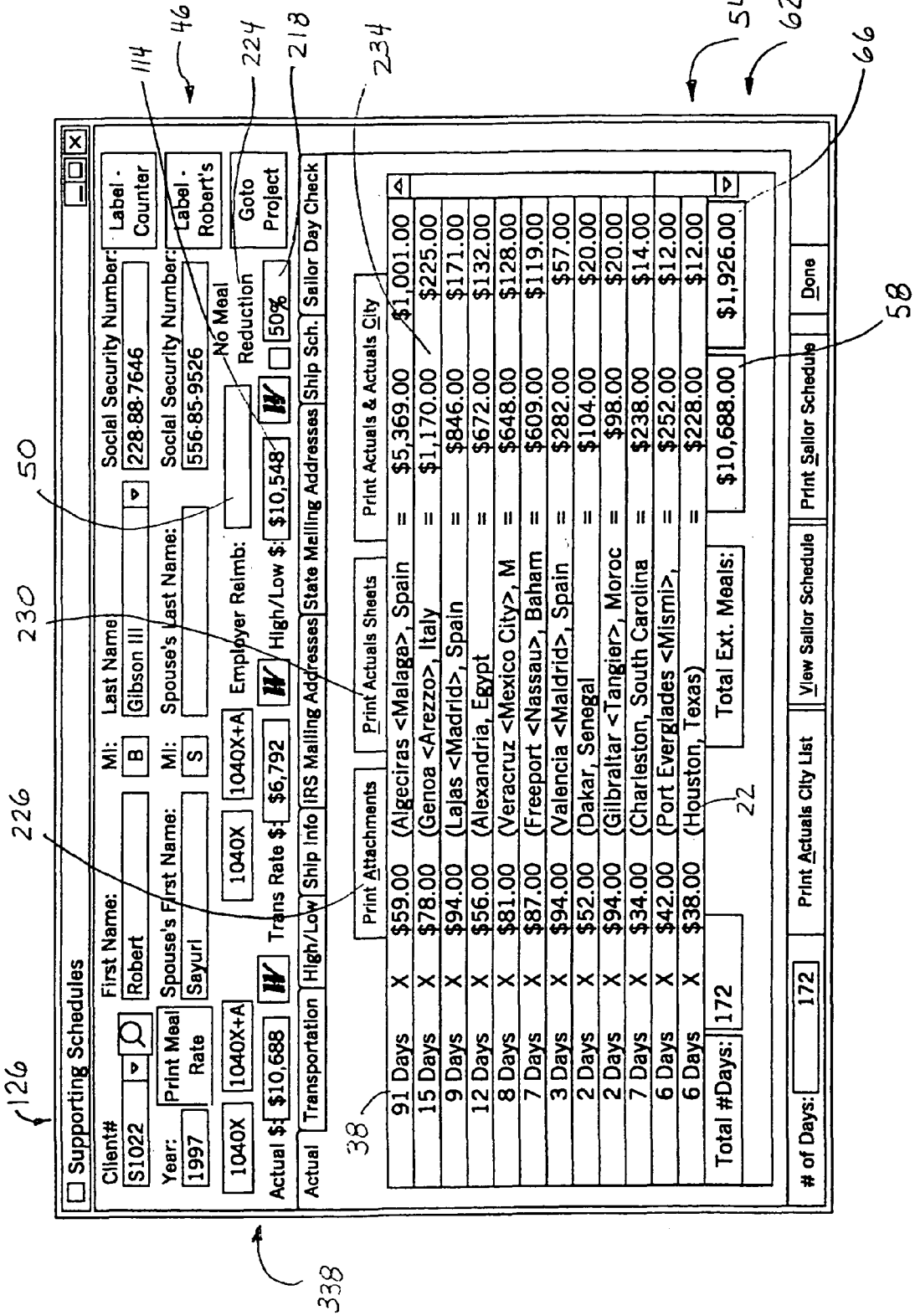
FIG. 4 is a schematic view of one of the supporting schedules used to determine a net expense allowance.

(3) In a further variant as illustrated in FIG. 7, an airport table 130 is provided. The airport table 130 includes an airport identifier code 134, an airport name 138, city code 142 and country name 146. When a location is input using either of an airport identifier code 134 and an airport name 138, the appropriate city 48 is determined for use in the supporting schedules 126.

(4) In yet a further variant of the invention as illustrated in FIG. 8, an airline table 150 is provided. The airline table 150 includes an airline name 154 and an airline ID number 158. The airline table 150 permits data merged with the client information table 70 to be sorted by airline 154.

(5) In still a further variant as illustrated in FIG. 9, an IRS service centers table 162 is provided. The IRS service centers table 162 includes an IRS mailing address for tax return submission 166, an IRS mailing address for submitting estimated tax payments 170 and an IRS ID code 174. The IRS service centers table 162 is merged with the supporting schedules 126 to determine an address 166, 170 to mail either of a taxpayer's federal tax return and a taxpayer's federal estimated tax payments to.

(6) In another variant as illustrated in FIG. 10, a state service centers table 178 is provided. The state service centers table 178 includes a state income tax mailing address for tax return submission 182, a state mailing address for submitting estimated tax payments 186 and a state ID code 190. The state service centers table 178 is merged with the supporting schedules 126 to determine an address 182, 186 to mail either of a taxpayer's state tax return and a taxpayer's state estimated tax payments to.

(7) In still another variant of the invention as illustrated in FIG. 11, a zip code table 194 is provided. The zip code table 194 includes a five-digit zip code 78, a corresponding city 48, county 198 and state 202. The zip code table 194 is used to verify the zip code 78 input in the client information table 70 and to provide the taxpayer's county 198. The zip code table 194 is used to generate mailing labels (not shown) for the taxpayer's state and federal tax returns.

(8) In yet another variant as illustrated in FIG. 12, an attachments table 210 is provided. The attachments table 210 stores links 132 to IRS and state tax publication pages, tax year 106 and work code 86. The attachments table 210 is compared to the client information table 70 to determine appropriate publication pages to include with the taxpayer's tax returns.

(9) In still another variant as illustrated in FIG. 14, a meal rate percent table 214 is provided. The meal rate percent table 214 includes the tax year 106 and meal rate percent 218. The meal rate percent 218 is used to reduce the meal rate 114 allowed.

(10) In yet another variant of the invention as illustrated in FIG. 4, further supporting schedules 126 display a taxpayer's travel computations and provides means to calculate the taxpayer's travel deduction based upon the plurality of travel calculation rates allowed by the IRS. The further supporting schedules 126 provide means 46 to enter the expense reimbursements 50 received from the taxpayer's employer. The supporting schedules 126 provide means 224 to optionally decline use of the meal rate percent table 214 to reduce the meal rate 114 allowed. The supporting schedules 126 provide means 226 to print out IRS publications and revenue procedures related to the taxpayer's occupation. The supporting schedules 126 provide means 230 to print out an IRS rate sheet 234 for each city 48 visited. The rate sheets 234 are printed in descending order based upon the taxpayer's travel deduction for each city 48 visited with the city 48 highlighted on each sheet 234.

(11) In a further variant, as illustrated in FIGS. 28A, 28B and 28C, a plurality of customizable document templates 238 are provided. The templates 238 are selected by the system 10 based upon tax year 106, work code 86, combined meal and incidental rate 114, incidental portion 116 and full rate 118 applied and an amended return code 242. The templates 238 include a taxpayer's name 42, Social Security number 82, tax year 106, occupation description 246, legal justification for claiming travel deductions 250, each city visited 48, applicable deduction 254 for the city 48, a total travel deduction FIG. 258, expense reimbursements 50 received from the taxpayer's employer, meal rate percent 218 for the tax year 106, a meal rate percent reduction amount 262 and a remaining amount available 266 for deduction.

Figure 16:
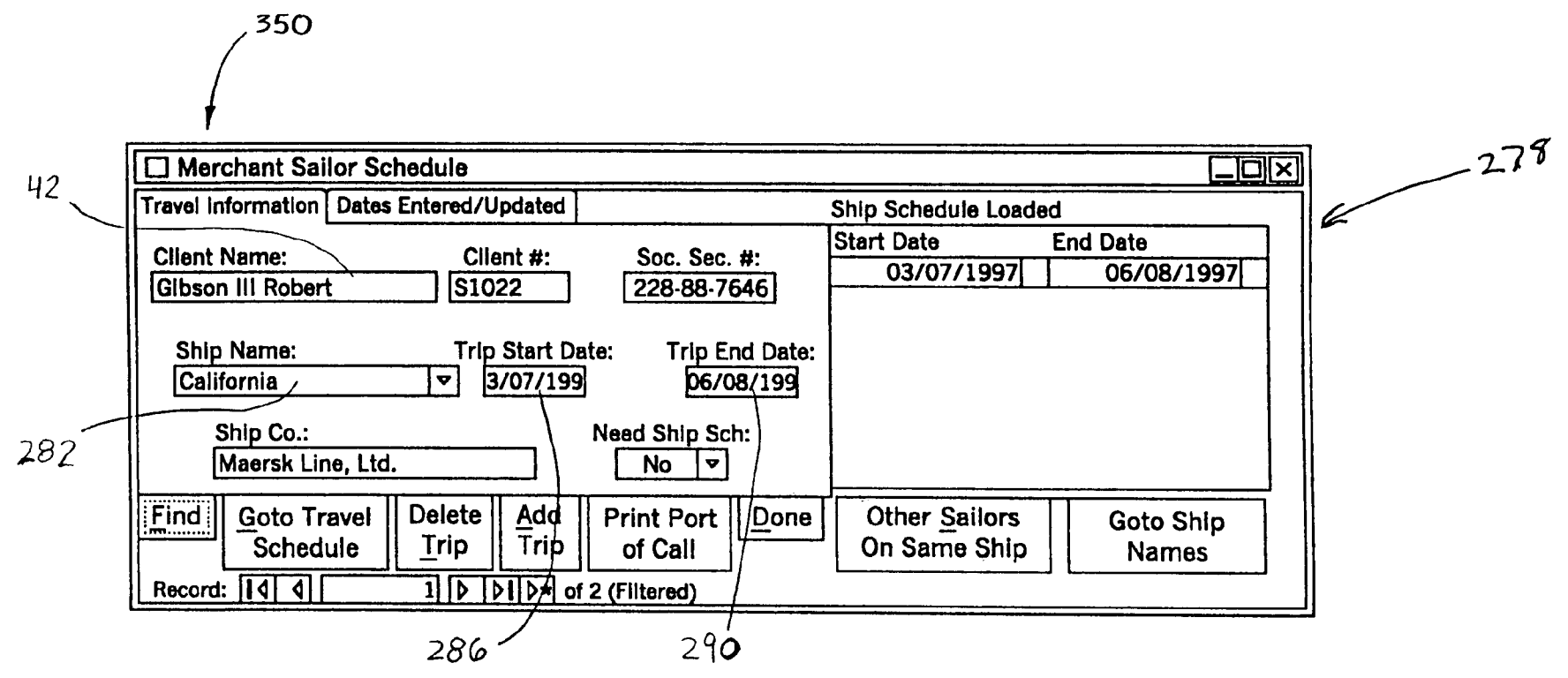
Figure 18:
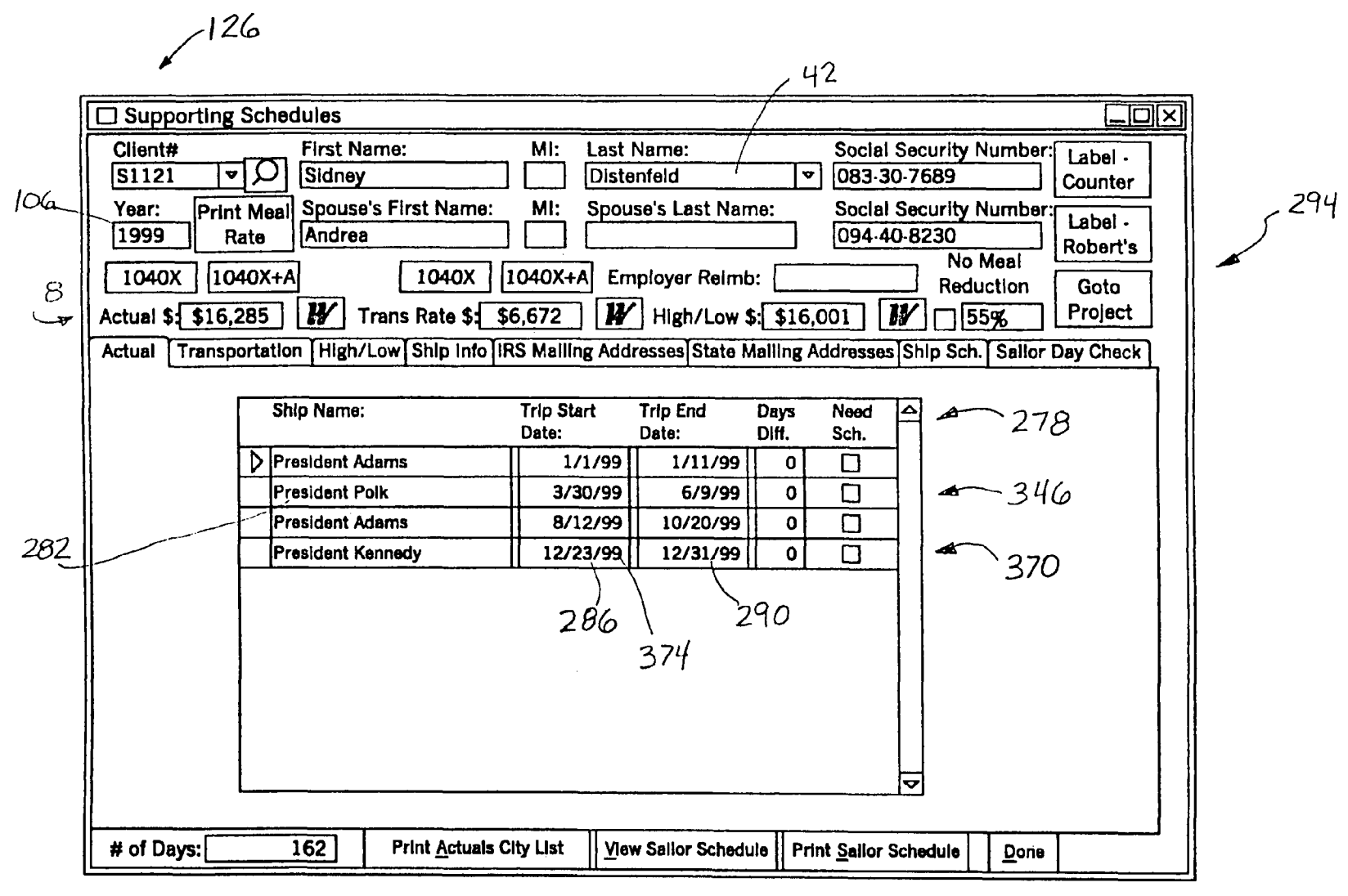

(12) In still a further variant as illustrated in FIG. 15, a ship location table 270 is provided. The ship location table 270 includes city rate codes 142 for each day of a tax year 106 for a plurality of ship name codes 274. As illustrated in FIG. 16, means 278 are provided for inputting names of ships 282 on which a taxpayer 42 has worked and starting 286 and ending 290 dates for work on each of the ships 282. As illustrated in FIGS. 15 and 18, means 294 are provided for determining locations 142 and durations of stay 38 for the taxpayer 42 based upon the ship location table 270 and the input ship names 282 and starting 286 and ending 290 dates for work on each of the ships 282.

Figure 13:
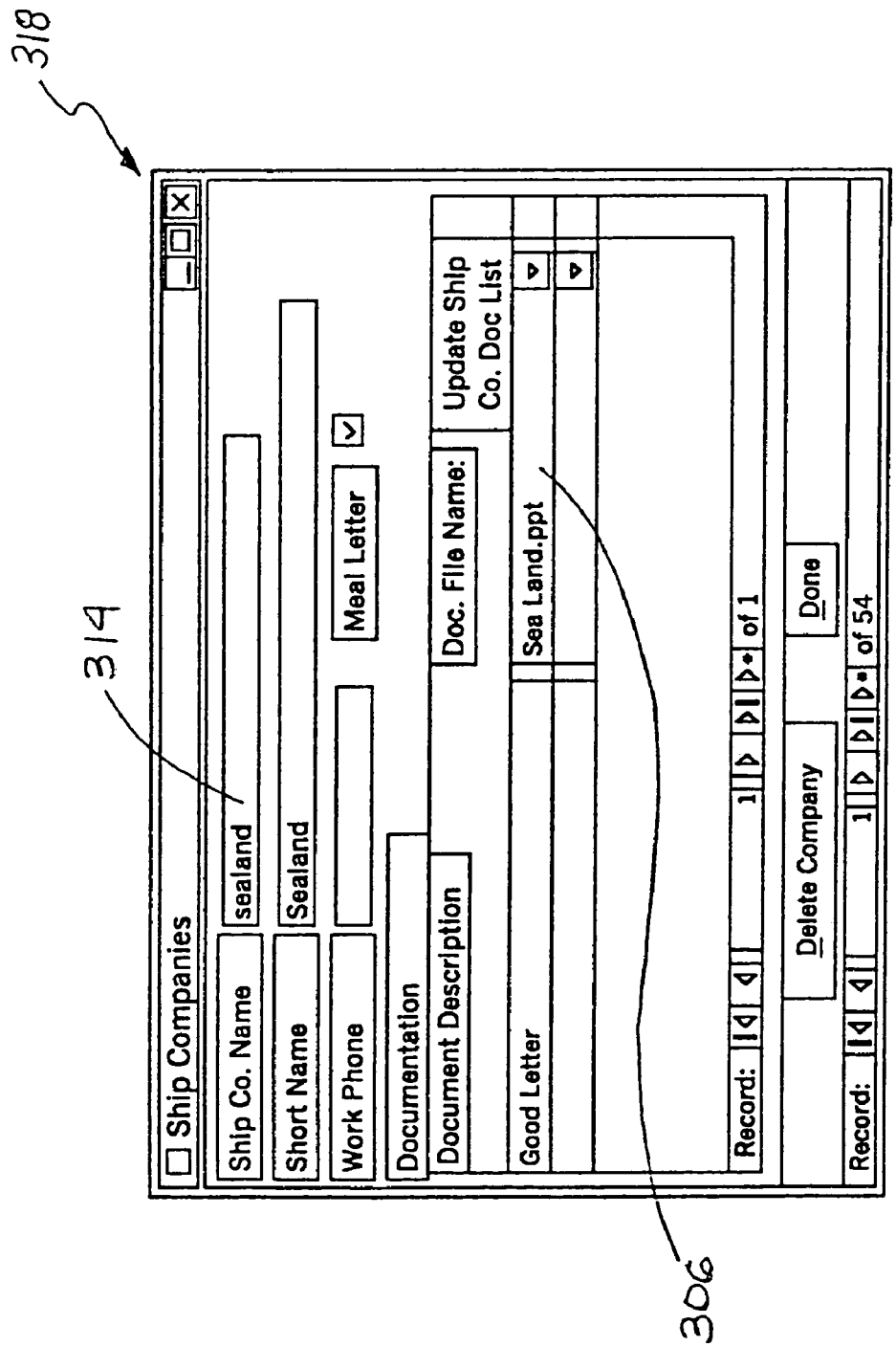
FIG. 13 is a schematic view of the Ship Companies input screen.

(13) In yet a further variant as illustrated in FIG. 19, a shipping company documents table 298 is provided. The shipping company documents table 298 includes a shipping company ID code 302 and a pointer to a shipping company document file name 306. A shipping companies table 310 as illustrated in FIGS. 13 and 17, is provided. The shipping companies table 310 including the shipping company ID code 302 and a shipping company name 314. Means 318 are provided for printing the shipping company document 306.

Figure 21:
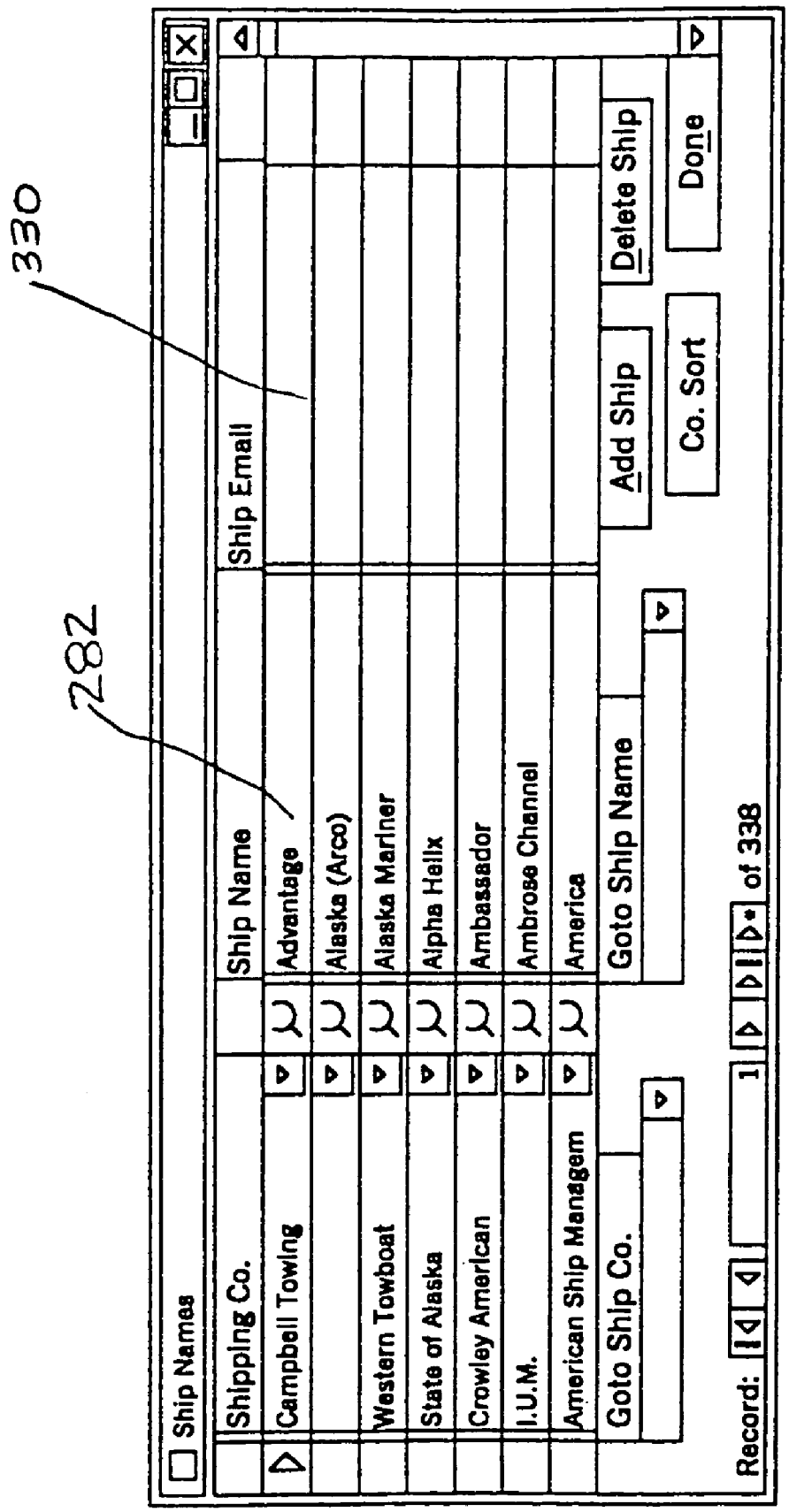
FIG. 21 is a schematic view of the Ship Names input screen.
Figure 29:
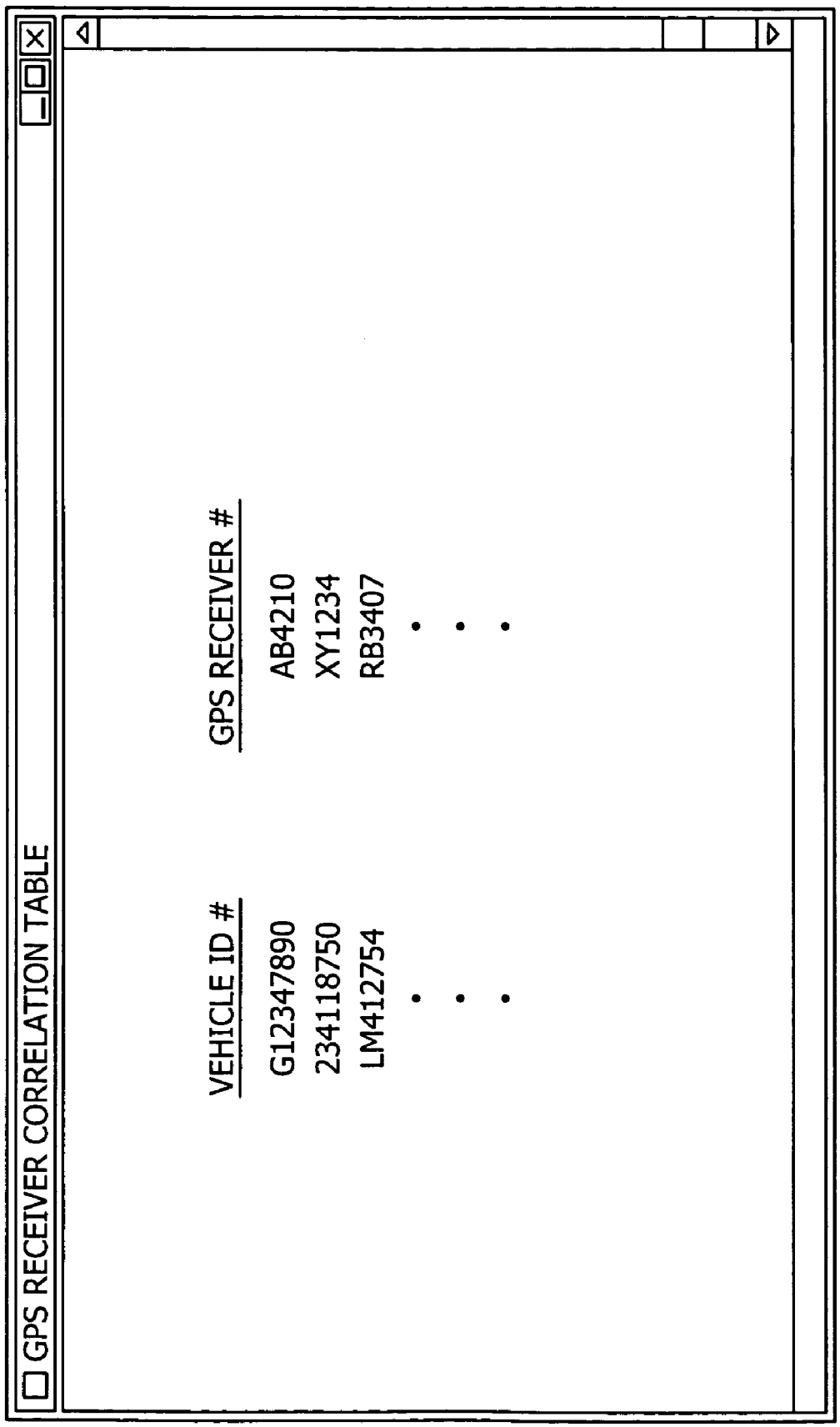
FIG. 29 is a schematic view of the GPS Receiver Correlation table.
Figure 32:
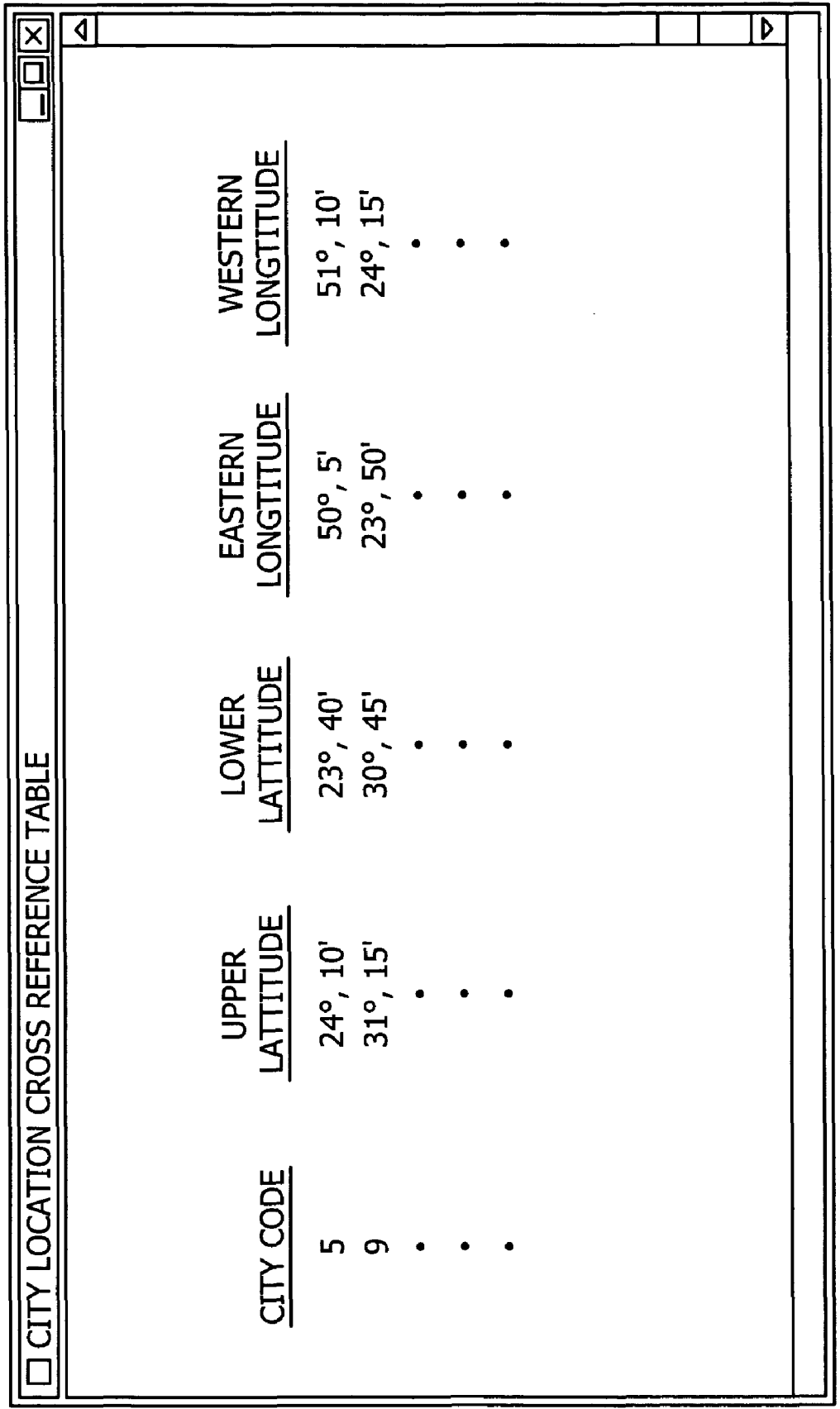
FIG. 32 is a schematic view of the City Location Cross Reference table.

(14) In still a further variant, as illustrated in FIGS. 20 and 21, a ship names table 322 is provided. The ship name table 322 includes a ship name code 326, the ship name 282, the shipping ID code 302 and each ship's e-mail address 330.

(15) In another variant of the invention, as illustrated in FIGS. 1, 4, 15 and 18, supporting schedules 126 merge the ships location table 270 and the city rate table 14 to provide meal and incidental rates 114 and full rates 118 for each city 48 visited. Means 338 are provided for determining the highest meal and incidental rates 114 and full rates 118 applicable for taxpayers 42 traveling between cities 48 for at least one day.

Figure 22:
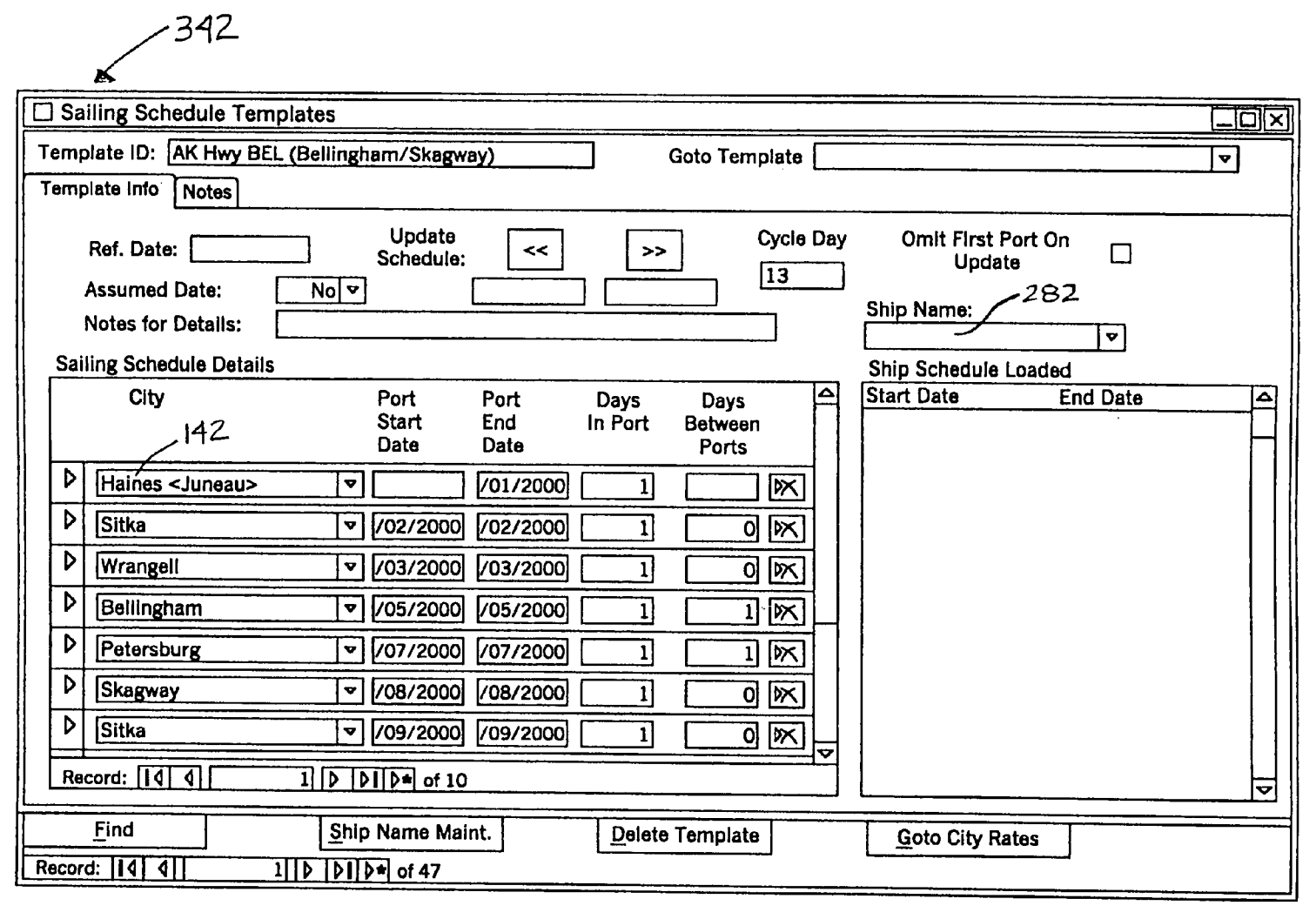

(16) In still another variant, as illustrated in FIG. 22, a series of data entry templates 342 is provided. The templates 342 include the ship locations 142 recorded in the ship location table 270 for names of ships 282 associated with each shipping company name 314. The templates 342 permit rapid entry of ship locations 142 for ships 282 following identical routes, the routes having different starting dates.

(17) In yet another variant, as illustrated in FIG. 18, means 346 are provided for reviewing the travel start 286 and end 290 dates for any input ship name 282 and tax year 106.

(18) In a further variant, as illustrated in FIGS. 15 and 16, a merchant sailor schedule table 350 is provided. The merchant sailor schedule table 350 includes the taxpayer's name 42, the ship name 282, the trip start date 286 and the trip end date 290 as recorded on the taxpayer's U.S. Coast Guard Discharge Papers. The merchant sailor schedule table 350 is used in conjunction with the ship location table 270 to provide the incidental portion 116 of meal rates 114 and full rates 118 for each city 48 visited by the taxpayer 42 in a tax year 106, as illustrated in FIG. 28B.

(19) In still a further variant of the invention, as illustrated in FIG. 23, means 358 are provided for printing a ports of call statement 362 illustrating the location of a ship 282 for each day of a tax year 106.

Figure 5:
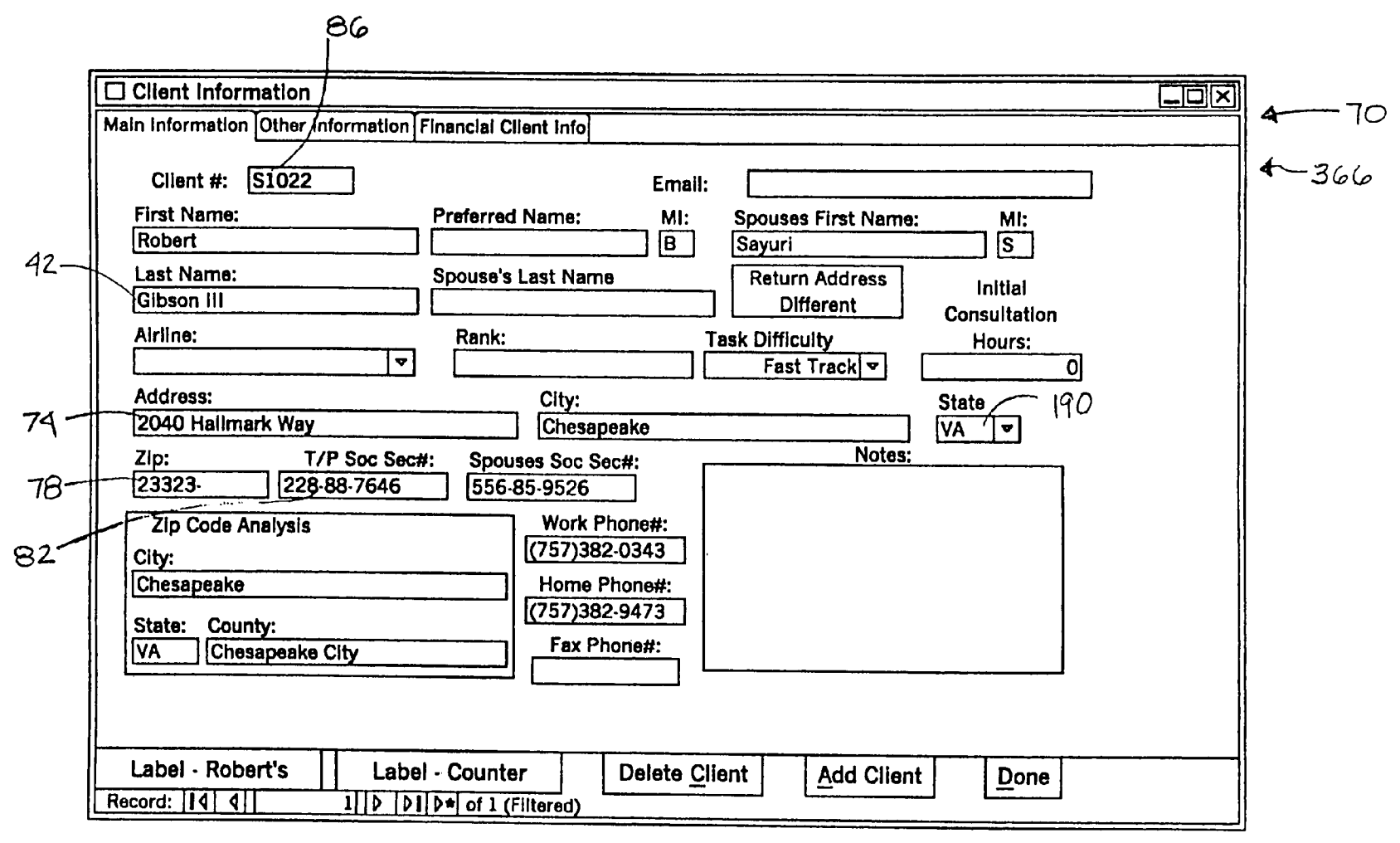

(20) In yet a further variant, as illustrated in FIGS. 5 and 16, means 366 are provided for accessing the client information table 70 and the merchant sailor schedule table 350 to provide a listing of all of the taxpayers 42 associated with any ship 282 during a tax year 106 and the means 74 for contacting the taxpayers 42.

(21) In another variant, as illustrated in FIGS. 16 and 18, means 370 are provided for displaying a chronological listing 374 of all of the U.S. Coast Guard Discharge Paper data input for the taxpayer 42 for a tax year 106 to the merchant sailor schedule table 350 to determine if any travel days are unaccounted for.

(22) In a another variant of the invention, as illustrated in FIGS. 24-27, means 378 for identifying all tasks 382 associated with the preparation of a tax return are provided as are means 386 for identifying all results 390 associated with the performance of the tasks 382. Means 394 are provided for linking the results 390 to a subsequent task 382. Means 398 are provided for determining the skill level 402 of a tax preparation worker 406 required to complete each task 382 as are means for identifying the skill level 402 of each tax preparation worker 406. Means 410 are provided for assigning each uncompleted task 382 to workers 406 of the required skill level 402 as are means 414 for indicating which worker 406 will work on each task 382. Means 418 are provided for indicating completion of each task 382 for removal from the system 10.

(23) In still another variant, the means 30 for inputting cities visited 48 and durations of stay 38 for a taxpayer 42 further includes a global positioning system (GPS) receiver 422 affixed to a taxpayer's vehicle 426. The vehicle 426 has a unique vehicle identification number 430 and the receiver 422 has a unique receiver code 434. The GPS receiver 422 receives location waypoints 438 for the receiver 422. A GPS receiver correlation table 442 is provided. The correlation table 442 includes the vehicle identification number 430 and the receiver code 434. A vehicle use table 446 is provided. The vehicle use table 446 includes the taxpayer's name 42, Social Security number 82, vehicle identification numbers 430 and dates of use 450 for each of the vehicle identification numbers 430. Means 454 are provided for inputting and maintaining data in the tables 442, 446.

A data relay 458 is provided. The data relay 458 passes location waypoints 438 received from the coded GPS receiver 422 to a data collection system 462 at predetermined intervals 466. A mapping system 470 is provided. The mapping system 470 accesses the data collection system 462 and the city rate table 14 and determines and stores a highest per diem cost city code 122 within a predetermined distance 474 of the waypoints 438 during a given day for each of the receiver codes 434. A data analysis system 478 is provided. The analysis system 478 accesses the GPS receiver correlation table 442, the vehicle use table 446 and the mapping system 470 to determine and store the highest per diem cost city code 122 for the taxpayer 42 for each day of a tax year 106.

(24) In a further variant of the invention, a global positioning system (GPS) receiver 422 is carried by a traveling taxpayer 42. The receiver 422 has a unique receiver code 434. The GPS receiver 422 receives location waypoints 438 for the receiver 422. A receiver use table 482 is provided. The receiver use table 482 includes the taxpayer's name 42, Social Security number 82, GPS receiver code 434 and dates of use 450 for each of the receiver codes 434. Means 454 are provided for inputting and maintaining data in the receiver use table 482. A data relay 458 is provided. The data relay 458 passes location waypoints 438 received from the coded GPS receiver 422 to a data collection system 462 at predetermined intervals 466. A mapping system 470 is provided. The mapping system 470 accesses the data collection system 462 and the city rate table 14 and determines and stores a highest per diem cost city code 122 within a predetermined distance 474 of the waypoints 438 during a given day for each of the receiver codes 434. A data analysis system 478 is provided. The data analysis system 478 accesses the receiver use table 482 and the mapping system 470 to determine and store the highest per diem cost city code 122 for the taxpayer 42 for each day of a tax year 106.

(24) In a variant of the invention, as illustrated in FIG. 5, a client information table 70 is provided. The client information table 70 includes a taxpayer's name 42, address 74, zip code 78, Social Security number 82 and a work code 86. A USA States table 90 is provided as illustrated in FIG. 6. The States table 90 includes each state's name 94, a state ID code 190, a lower 48 state code 98, and an IRS center code 102. The city rate table 14 as illustrated in FIG. 1, also includes a tax year 106, a city code 110, combined meal and incidental rate 114, full rate 118, and high cost city code 122. As illustrated in FIG. 6A, a city name table is provided. The city name table includes city code 110, city 48, state ID code 190, and country name 56. Supporting schedules 126 as illustrated in FIGS. 4 and 18, are provided. The supporting schedules 126 merge data from the client information table 70, the USA States table 90, and the city rate table 14 with the input cities 48 and durations of stay 38 for the taxpayer 42. Means are provided for inputting and maintaining data in each of the tables 14, 70, 90, 126.

(25) In still a further variant as illustrated in FIG. 9, an IRS service centers table 162 is provided. The IRS service centers table 162 includes an IRS mailing address for tax return submission 166, an IRS mailing address for submitting estimated tax payments 170 and an IRS ID code 174. The IRS service centers table 162 is merged with the supporting schedules 126 to determine an address 166, 170 to mail either of a taxpayer's federal tax return and a taxpayer's federal estimated tax payments to.

(26) In another variant as illustrated in FIG. 10, a state service centers table 178 is provided. The state service centers table 178 includes a state income tax mailing address for tax return submission 182, a state mailing address for submitting estimated tax payments 186 and a state ID code 190. The state service centers table 178 is merged with the supporting schedules 126 to determine an address 182, 186 to mail either of a taxpayer's state tax return and a taxpayer's state estimated tax payments to.

(27) In still another variant of the invention as illustrated in FIG. 11, a zip code table 194 is provided. The zip code table 194 includes a five-digit zip code 78, a corresponding city 48, county 198 and state 202. The zip code table 194 is used to verify the zip code 78 input in the client information table 70 and to provide the taxpayer's county 198. The zip code table 194 is used to generate mailing labels (not shown) for the taxpayer's state and federal tax returns.

(28) In yet another variant as illustrated in FIG. 12, an attachments table 210 is provided. The attachments table 210 stores links 132 to IRS and state tax publication pages, tax year 106 and work code 86. The attachments table 210 is compared to the client information table 70 to determine appropriate publication pages to include with the taxpayer's tax returns.

(29) In still another variant as illustrated in FIG. 14, a meal rate percent table 214 is provided. The meal rate percent table 214 includes the tax year 106 and meal rate percent 218. The meal rate percent 218 is used to reduce the meal rate 114 allowed.

(30) In yet another variant of the invention as illustrated in FIG. 4, further supporting schedules 126 display a taxpayer's travel computations and provides means to calculate the taxpayer's travel deduction based upon the plurality of travel calculation rates allowed by the IRS. The further supporting schedules 126 provide means 46 to enter the expense reimbursements 50 received from the taxpayer's employer. The supporting schedules 126 provide means 224 to optionally decline use of the meal rate percent table 214 to reduce the meal rate 114 allowed. The supporting schedules 126 provide means 226 to print out IRS publications and revenue procedures related to the taxpayer's occupation. The supporting schedules 126 provide means 230 to print out an IRS rate sheet 234 for each city 48 visited. The rate sheets 234 are printed in descending order based upon the taxpayer's travel deduction for each city 48 visited with the city 48 highlighted on each sheet 234.

(31) In a further variant, as illustrated in FIGS. 28A, 28B and 28C, a plurality of customizable document templates 238 are provided. The templates 238 are selected by the system 10 based upon tax year 106, work code 86, combined meal and incidental rate 114, incidental portion 116 and full rate 118 applied and an amended return code 242. The templates 238 include a taxpayer's name 42, Social Security number 82, tax year 106, occupation description 246, legal justification for claiming travel deductions 250, each city visited 48, applicable deduction 254 for the city 48, a total travel deduction FIG. 258, expense reimbursements 50 received from the taxpayer's employer, meal rate percent 218 for the tax year 106, a meal rate percent reduction amount 262 and a remaining amount available 266 for deduction.

(32) In a further variant, the data relay is a transmitter co-located with the GPS receiver.

(33) In still a further variant, the data collection system 462 is a computerized data base 482 receiving and storing the location waypoints 438 received from the coded GPS receiver 422 at the predetermined intervals 466.

(34) In a final variant, the mapping system 470 further includes a distance adjuster 486. The distance adjuster 486 permits a user 490 to set the predetermined distance 474 at which a city 48 will be considered an overnight stop 494 for a taxpayer 42.

The income tax preparation system for traveling taxpayers 10 has been described with reference to particular embodiments. Other modifications and enhancements can be made without departing from the spirit and scope of the claims that follow.

The invention claimed is:

1. A system for determining travel deductions for taxpayers who stay overnight in cities remote from their homes as part of their employment, comprising:
    a city rate table identifying allowed per diem expense rates for a given tax year for a plurality of cities as identified by a city code;
    means for inputting and maintaining data in said table;
    a global positioning system (GPS) receiver affixed to a taxpayer's vehicle, said vehicle having a unique vehicle identification number and said receiver having a unique receiver code;
    said GPS receiver receiving location waypoint information for said receiver;
    a GPS receiver correlation table, said correlation table comprising said vehicle identification number and said receiver code;
    a vehicle use table, said vehicle use table comprising said taxpayer's name, Social Security number, vehicle identification numbers and dates of use for each of said vehicle identification numbers;
    means for inputting and maintaining data in said tables;
    a data relay, said data relay passing location waypoints received from said coded GPS receiver to a data collection system at predetermined intervals;
    a mapping system, said mapping system accessing said data collection system and said city rate table and determining and storing a highest per diem cost city code within a predetermined distance of said waypoints during a given day for each of said receiver codes;
    a data analysis system, said analysis system accessing said GPS receiver correlation table, said vehicle use table and said mapping system to determine and store said highest per diem cost city code for said taxpayer for each day of a tax year;
    means for inputting expense reimbursements received from the taxpayer's employer;
    means for calculating a total of all per diem expenses based upon said city rate table and the input cities and number of days of stay in said cities; and
    means for offsetting the reimbursements against said total to determine an incidental expense allowance.

2. A system for determining travel deductions for taxpayers who stay overnight in locations remote from their homes as part of their employment as described in claim 1, further comprising:
    a client information table, said information table comprising a taxpayer's name, address, zip code, Social Security number and a work code;
    a USA States table, said States table comprising each state's name, a state ID code, a lower 48 state code, and an IRS center code;
    said city rate table further comprising a tax year, a city code, combined meal and incidental rate, full rate, and high cost city code;
    a city name table, said city name table comprising said city code, said city, said state ID code, and a country name;
    supporting schedules, said supporting schedules merging data from said client information table, said USA States table, and said city rate table with the input cities and durations of stay for the taxpayer; and
    means for inputting and maintaining data in each of said tables.

3. A system for determining travel deductions for taxpayers who stay overnight in locations remote from their homes as part of their employment as described in claim 2, further comprising:
    an airport table, said airport table comprising an airport identifier code, an airport name, city code and country name; and
    whereby, when a location is input using either of an airport identifier code and an airport name, the appropriate city is determined for use in said supporting schedules.

4. A system for determining travel deductions for taxpayers who stay overnight in locations remote from their homes as part of their employment as described in claim 2, further comprising:
    an airlines table, said airlines table comprising an airline name and an airline ID number; and
    said airlines table permitting data merged with the client information table to be sorted by airline.

5. A system for determining travel deductions for taxpayers who stay overnight in locations remote from their homes as part of their employment as described in claim 2, further comprising:
    an IRS service centers table, said IRS service centers table comprising an IRS mailing address for tax return submission, an IRS mailing address for submitting estimated tax payments and an IRS ID code; and
    said IRS service centers table being merged with said supporting schedules to determine an address to mail either of a taxpayer's federal tax return and a taxpayer's federal estimated tax payments to.

6. A system for determining travel deductions for taxpayers who stay overnight in locations remote from their homes as part of their employment as described in claim 2, further comprising:
    a state service centers table, said state service centers table comprising a state income tax mailing address for tax return submission, a state mailing address for submitting estimated tax payments and a state ID code; and
    said state service center table being merged with said supporting schedules to determine an address to mail either of a taxpayer's state tax return and a taxpayer's state estimated tax payments to.

7. A system for determining travel deductions for taxpayers who stay overnight in locations remote from their homes as part of their employment as described in claim 2, further comprising:
    a zip code table, said zip code table comprising a five-digit zip code, a corresponding city, county and state;
    said zip code table being used to verify the zip code input in the client information table and to provide the taxpayer's county; and
    said zip code table being used to generate mailing labels for the taxpayer's state and federal tax returns.

8. A system for determining travel deductions for taxpayers who stay overnight in locations remote from their homes as part of their employment as described in claim 2, further comprising:
an attachments table, said attachments table storing links to IRS and state tax publication pages, tax year and work code; and
said attachments table being compared to the client information table to determine appropriate publication pages to include with the taxpayer's tax returns.

9. A system for determining travel deductions for taxpayers who stay overnight in locations remote from their homes as part of their employment as described in claim 2, further comprising:
a meal rate percent table, said meal rate percent table comprising the tax year and meal rate percent; and
said meal rate percent being used to reduce the meal rate allowed.

10. A system for determining travel deductions for taxpayers who stay overnight in locations remote from their homes as part of their employment as described in claim 9, further comprising:
further supporting schedules, said further supporting schedules displaying a taxpayer's travel computations and providing means to calculate the taxpayer's travel deduction based upon the plurality of travel calculation rates allowed by the IRS;
said further supporting schedules providing means to enter the expense reimbursements received from the taxpayer's employer;
said further supporting schedules providing means to optionally decline use of the meal rate percent table to reduce the meal rate allowed;
said further supporting schedules providing means to print out IRS publications and revenue procedures related to the taxpayer's occupation; and
said further supporting schedules providing means to print out an IRS rate sheet for each city visited; and
said rate sheets are printed in descending order based upon the taxpayer's travel deduction for each city visited with the city highlighted on each sheet.

11. A system for determining travel deductions for taxpayers who stay overnight in locations remote from their homes as part of their employment as described in claim 10, further comprising:
a plurality of customizable document templates, said templates being selected by the system based upon tax year, work code, combined meal and incidental rate, incidental portion and full rate applied and an amended return code; and
said templates comprising a taxpayer's name, Social Security number, tax year, occupation description, legal justification for claiming travel deductions, each city visited, applicable deduction for said city, a total travel deduction figure, expense reimbursements received from the taxpayer's employer, meal rate percent for the tax year, a meal rate percent reduction amount and a remaining amount available for deduction.

12. A system for determining travel deductions for taxpayers who stay overnight in locations remote from their homes as part of their employment as described in claim 1, further comprising:
means for identifying all tasks associated with the preparation of a tax return;
means for identifying all results associated with the performance of said tasks;
means for linking said results to a subsequent task;
means for determining the skill level of a tax preparation worker required to complete each task;
means for identifying the skill level of each tax preparation worker;
means for assigning each uncompleted task to workers of the required skill level;
means for indicating which worker will work on each task; and
means for indicating completion of each task for removal from the system.

13. The system for determining travel deductions for taxpayers who stay overnight in locations remote from their homes as part of their employment as described in claim 1, further comprising:
a client information table, said information table comprising a taxpayer's name, address, zip code, Social Security number and a work code;
a USA States table, said States table comprising each state's name, a state ID code, a lower 48 state code, and an IRS center code;
said city rate table further comprising a tax year, a city code, combined meal and incidental rate, full rate, and high cost city code;
a city name table, said city name table comprising said city code, said city, said state ID code, and a country name;
supporting schedules, said supporting schedules merging data from said client information table, said USA States table, and said city rate table with the input cities and durations of stay for the taxpayer; and
means for inputting and maintaining data in each of said tables.

14. The system for determining travel deductions for taxpayers who stay overnight in locations remote from their homes as part of their employment as described in claim 1, further comprising:
an IRS service centers table, said IRS service centers table comprising an IRS mailing address for tax return submission, an IRS mailing address for submitting estimated tax payments and an IRS ID code; and
said IRS service centers table being merged with said supporting schedules to determine an address to mail either of a taxpayer's federal tax return and a taxpayer's federal estimated tax payments to.

15. The system for determining travel deductions for taxpayers who stay overnight in locations remote from their homes as part of their employment as described in claim 1, further comprising:
a state service centers table, said state service centers table comprising a state income tax mailing address for tax return submission, a state mailing address for submitting estimated tax payments and a state ID code; and
said state service center table being merged with said supporting schedules to determine an address to mail either of a taxpayer's state tax return and a taxpayer's state estimated tax payments to.

16. The system for determining travel deductions for taxpayers who stay overnight in locations remote from their homes as part of their employment as described in claim 1, further comprising:
a zip code table, said zip code table comprising a five-digit zip code, a corresponding city, county and state;
said zip code table being used to verify the zip code input in the client information table and to provide the taxpayer's county; and
said zip code table being used to generate mailing labels for the taxpayer's state and federal tax returns.

17. The system for determining travel deductions for taxpayers who stay overnight in locations remote from their homes as part of their employment as described in claim 1, further comprising:
an attachments table, said attachments table storing links to IRS and state tax publication pages, tax year and work code; and
said attachments table being compared to the client information table to determine appropriate publication pages to include with the taxpayer's tax returns.

18. The system for determining travel deductions for taxpayers who stay overnight in locations remote from their homes as part of their employment as described in claim 1, further comprising:
a meal rate percent table, said meal rate percent table comprising the tax year and meal rate percent; and
said meal rate percent being used to reduce the meal rate allowed.

19. The system for determining travel deductions for taxpayers who stay overnight in locations remote from their homes as part of their employment as described in claim 18, further comprising:
further supporting schedules, said further supporting schedules displaying a taxpayer's travel computations and providing means to calculate the taxpayer's travel deduction based upon the plurality of travel calculation rates allowed by the IRS;
said further supporting schedules providing means to enter the expense reimbursements received from the taxpayer's employer;
said further supporting schedules providing means to optionally decline use of the meal rate percent table to reduce the meal rate allowed;
said further supporting schedules providing means to print out IRS publications and revenue procedures related to the taxpayer's occupation; and
said further supporting schedules providing means to print out an IRS rate sheet for each city visited; and
said rate sheets are printed in descending order based upon the taxpayer's travel deduction for each city visited with the city highlighted on each sheet.

20. The system for determining travel deductions for taxpayers who stay overnight in locations remote from their homes as part of their employment as described in claim 19, further comprising:
a plurality of customizable document templates, said templates being selected by the system based upon tax year, work code, combined meal and incidental rate, incidental portion and full rate applied and an amended return code; and
said templates comprising a taxpayer's name, Social Security number, tax year, occupation description, legal justification for claiming travel deductions, each city visited, applicable deduction for said city, a total travel deduction figure, expense reimbursements received from the taxpayer's employer, meal rate percent for the tax year, a meal rate percent reduction amount and a remaining amount available for deduction.

21. The system for determining travel deductions for taxpayers who stay overnight in locations remote from their homes as part of their employment as described in claim 1, wherein said data collection system is a computerized data base receiving and storing said location waypoints received from said coded GPS receiver at said predetermined intervals.

22. A system for determining travel deductions for taxpayers who stay overnight in cities remote from their homes as part of their employment, comprising:
a city rate table identifying allowed per diem expense rates for a given tax year for a plurality of cities as identified by a city code;
means for inputting and maintaining data in said table;
a global positioning system (GPS) receiver carried by a traveling taxpayer, said receiver having a unique receiver code;
said GPS receiver receiving location waypoint information for said receiver;
a receiver use table, said receiver use table comprising said taxpayer's name, Social Security number, GPS receiver code and dates of use for each of said receiver codes;
means for inputting and maintaining data in said table;
a data relay, said data relay passing location waypoints received from said coded GPS receiver to a data collection system at predetermined intervals;
a mapping system, said mapping system accessing said data collection system and said city rate table and determining and storing a highest per diem cost city code within a predetermined distance of said waypoints during a given day for each of said receiver codes;
a data analysis system, said analysis system accessing said receiver use table and said mapping system to determine and store said highest per diem cost city code for said taxpayer for each day of a tax year;
means for inputting expense reimbursements received from the taxpayer's employer;
means for calculating a total of all per diem expenses based upon said city rate table and the input cities and number of days of stay in said cities; and
means for offsetting the reimbursements against said total to determine an incidental expense allowance.

23. A system for determining travel deductions for taxpayers who stay overnight in locations remote from their homes as part of their employment as described in claim 22, further comprising:
a client information table, said information table comprising a taxpayer's name, address, zip code, Social Security number and a work code;
a USA States table, said States table comprising each state's name, a state ID code, a lower 48 state code, and an IRS center code;
said city rate table further comprising a tax year, a city code, combined meal and incidental rate, full rate, and high cost city code;
a city name table, said city name table comprising said city code, said city, said state ID code, and a country name;
supporting schedules, said supporting schedules merging data from said client information table, said USA States table, and said city rate table with the input cities and durations of stay for the taxpayer; and
means for inputting and maintaining data in each of said tables.

24. A system for determining travel deductions for taxpayers who stay overnight in locations remote from their homes as part of their employment as described in claim 23, further comprising:
an airport table, said airport table comprising an airport identifier code, an airport name, city code and country name; and
whereby, when a location is input using either of an airport identifier code and an airport name, the appropriate city is determined for use in said supporting schedules.

25. A system for determining travel deductions for taxpayers who stay overnight in locations remote from their homes as part of their employment as described in claim 23, further comprising:

an airlines table, said airlines table comprising an airline name and an airline ID number; and said airlines table permitting data merged with the client information table to be sorted by airline.

26. A system for determining travel deductions for taxpayers who stay overnight in locations remote from their homes as part of their employment as described in claim 23, further comprising:

an IRS service centers table, said IRS service centers table comprising an IRS mailing address for tax return submission, an IRS mailing address for submitting estimated tax payments and an IRS ID code; and said IRS service centers table being merged with said supporting schedules to determine an address to mail either of a taxpayer's federal tax return and a taxpayer's federal estimated tax payments to.

27. A system for determining travel deductions for taxpayers who stay overnight in locations remote from their homes as part of their employment as described in claim 23, further comprising:

a state service centers table, said state service centers table comprising a state income tax mailing address for tax return submission, a state mailing address for submitting estimated tax payments and a state ID code; and said state service center table being merged with said supporting schedules to determine an address to mail either of a taxpayer's state tax return and a taxpayer's state estimated tax payments to.

28. A system for determining travel deductions for taxpayers who stay overnight in locations remote from their homes as part of their employment as described in claim 23, further comprising:

a zip code table, said zip code table comprising a five-digit zip code, a corresponding city, county and state;

said zip code table being used to verify the zip code input in the client information table and to provide the taxpayer's county; and said zip code table being used to generate mailing labels for the taxpayer's state and federal tax returns.

29. A system for determining travel deductions for taxpayers who stay overnight in locations remote from their homes as part of their employment as described in claim 23, further comprising:

an attachments table, said attachments table storing links to IRS and state tax publication pages, tax year and work code; and said attachments table being compared to the client information table to determine appropriate publication pages to include with the taxpayer's tax returns.

30. A system for determining travel deductions for taxpayers who stay overnight in locations remote from their homes as part of their employment as described in claim 23, further comprising:

a meal rate percent table, said meal rate percent table comprising the tax year and meal rate percent; and said meal rate percent being used to reduce the meal rate allowed.

31. A system for determining travel deductions for taxpayers who stay overnight in locations remote from their homes as part of their employment as described in claim 30, further comprising:

further supporting schedules, said further supporting schedules displaying a taxpayer's travel computations and providing means to calculate the taxpayer's travel deduction based upon the plurality of travel calculation rates allowed by the IRS;

said further supporting schedules providing means to enter the expense reimbursements received from the taxpayer's employer;

said further supporting schedules providing means to optionally decline use of the meal rate percent table to reduce the meal rate allowed;

said further supporting schedules providing means to print out IRS publications and revenue procedures related to the taxpayer's occupation; and said further supporting schedules providing means to print out an IRS rate sheet for each city visited; and said rate sheets are printed in descending order based upon the taxpayer's travel deduction for each city visited with the city highlighted on each sheet.

32. A system for determining travel deductions for taxpayers who stay overnight in locations remote from their homes as part of their employment as described in claim 31, further comprising:

a plurality of customizable document templates, said templates being selected by the system based upon tax year, work code, combined meal and incidental rate, incidental portion and full rate applied and an amended return code; and said templates comprising a taxpayer's name, Social Security number, tax year, occupation description, legal justification for claiming travel deductions, each city visited, applicable deduction for said city, a total travel deduction figure, expense reimbursements received from the taxpayer's employer, meal rate percent for the tax year, a meal rate percent reduction amount and a remaining amount available for deduction.

33. A system for determining travel deductions for taxpayers who stay overnight in locations remote from their homes as part of their employment as described in claim 22, further comprising:

means for identifying all tasks associated with the preparation of a tax return;

means for identifying all results associated with the performance of said tasks;

means for linking said results to a subsequent task;

means for determining the skill level of a tax preparation worker required to complete each task;

means for identifying the skill level of each tax preparation worker;

means for assigning each uncompleted task to workers of the required skill level;

means for indicating which worker will work on each task; and means for indicating completion of each task for removal from the system.

34. The system for determining travel deductions for taxpayers who stay overnight in locations remote from their homes as part of their employment as described in claim 22, further comprising:

a client information table, said information table comprising a taxpayer's name, address, zip code, Social Security number and a work code;

a USA States table, said States table comprising each state's name, a state ID code, a lower 48 state code, and an IRS center code;

said city rate table further comprising a tax year, a city code, combined meal and incidental rate, full rate, and high cost city code;

a city name table, said city name table comprising said city code, said city, said state ID code, and a country name;

supporting schedules, said supporting schedules merging data from said client information table, said USA States table, and said city rate table with the input cities and durations of stay for the taxpayer; and means for inputting and maintaining data in each of said tables.

35. The system for determining travel deductions for taxpayers who stay overnight in locations remote from their homes as part of their employment as described in claim 22, further comprising:

an IRS service centers table, said IRS service centers table comprising an IRS mailing address for tax return submission, an IRS mailing address for submitting estimated tax payments and an IRS ID code; and said IRS service centers table being merged with said supporting schedules to determine an address to mail either of a taxpayer's federal tax return and a taxpayer's federal estimated tax payments to.

36. The system for determining travel deductions for taxpayers who stay overnight in locations remote from their homes as part of their employment as described in claim 22, further comprising:

a state service centers table, said state service centers table comprising a state income tax mailing address for tax return submission, a state mailing address for submitting estimated tax payments and a state ID code; and said state service center table being merged with said supporting schedules to determine an address to mail either of a taxpayer's state tax return and a taxpayer's state estimated tax payments to.

37. The system for determining travel deductions for taxpayers who stay overnight in locations remote from their homes as part of their employment as described in claim 22, further comprising:

a zip code table, said zip code table comprising a five-digit zip code, a corresponding city, county and state;

said zip code table being used to verify the zip code input in the client information table and to provide the taxpayer's county; and said zip code table being used to generate mailing labels for the taxpayer's state and federal tax returns.

38. The system for determining travel deductions for taxpayers who stay overnight in locations remote from their homes as part of their employment as described in claim 22, further comprising:

an attachments table, said attachments table storing links to IRS and state tax publication pages, tax year and work code; and said attachments table being compared to the client information table to determine appropriate publication pages to include with the taxpayer's tax returns.

39. The system for determining travel deductions for taxpayers who stay overnight in locations remote from their homes as part of their employment as described in claim 22, further comprising:

a meal rate percent table, said meal rate percent table comprising the tax year and meal rate percent; and said meal rate percent being used to reduce the meal rate allowed.

40. The system for determining travel deductions for taxpayers who stay overnight in locations remote from their homes as part of their employment as described in claim 39, further comprising:

further supporting schedules, said further supporting schedules displaying a taxpayer's travel computations and providing means to calculate the taxpayer's travel deduction based upon the plurality of travel calculation rates allowed by the IRS;

said further supporting schedules providing means to enter the expense reimbursements received from the taxpayer's employer;

said further supporting schedules providing means to optionally decline use of the meal rate percent table to reduce the meal rate allowed;

said further supporting schedules providing means to print out IRS publications and revenue procedures related to the taxpayer's occupation; and said further supporting schedules providing means to print out an IRS rate sheet for each city visited; and said rate sheets are printed in descending order based upon the taxpayer's travel deduction for each city visited with the city highlighted on each sheet.

41. The system for determining travel deductions for taxpayers who stay overnight in locations remote from their homes as part of their employment as described in claim 40, further comprising:

a plurality of customizable document templates, said templates being selected by the system based upon tax year, work code, combined meal and incidental rate, incidental portion and full rate applied and an amended return code; and said templates comprising a taxpayer's name, Social Security number, tax year, occupation description, legal justification for claiming travel deductions, each city visited, applicable deduction for said city, a total travel deduction figure, expense reimbursements received from the taxpayer's employer, meal rate percent for the tax year, a meal rate percent reduction amount and a remaining amount available for deduction.

42. The system for determining travel deductions for taxpayers who stay overnight in locations remote from their homes as part of their employment as described in claim 22, wherein said data collection system is a computerized data base receiving and storing said location waypoints received from said coded GPS receiver at said predetermined intervals.

\* \* \* \* \*